United States Patent
Bonk

(10) Patent No.: US 6,857,703 B2
(45) Date of Patent: Feb. 22, 2005

(54) FOLD, TUMBLE AND KNEEL SEAT ASSEMBLY

(75) Inventor: Jeffery T. Bonk, Clinton Township, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 15 days.

(21) Appl. No.: 10/288,246

(22) Filed: Nov. 5, 2002

(65) Prior Publication Data

US 2004/0084946 A1 May 6, 2004

(51) Int. Cl.[7] .................................................. B60N 2/36
(52) U.S. Cl. ........................... 297/378.14; 297/378.13; 297/331; 297/336
(58) Field of Search ..................... 297/378.13, 344.15, 297/344.13, 331, 336, 378.14

(56) References Cited

U.S. PATENT DOCUMENTS

| | | | | |
|---|---|---|---|---|
| 3,880,464 A | * | 4/1975 | Murphy et al. | 297/378.13 X |
| 4,475,769 A | * | 10/1984 | Crawford et al. | 297/331 |
| 4,484,776 A | * | 11/1984 | Gokimoto et al. | 297/378.13 X |
| 4,636,003 A | * | 1/1987 | Siebler | 297/336 |
| 4,695,094 A | * | 9/1987 | Siebler | 297/331 |
| 4,700,989 A | * | 10/1987 | Ercilla | 297/331 |
| 4,736,985 A | * | 4/1988 | Fourrey et al. | 297/331 |
| 5,765,894 A | * | 6/1998 | Okazaki et al. | 297/378.13 X |
| 6,000,742 A | * | 12/1999 | Schaefer et al. | 297/336 X |
| 6,220,665 B1 | * | 4/2001 | Dingel et al. | 297/336 X |
| 6,375,255 B1 | * | 4/2002 | Maruta et al. | 297/378.13 X |
| 6,478,358 B1 | * | 11/2002 | Okazaki et al. | 297/336 X |
| 6,513,873 B2 | * | 2/2003 | Tsuda et al. | 297/336 X |
| 6,520,581 B1 | * | 2/2003 | Tame | 297/336 |
| 6,523,899 B1 | * | 2/2003 | Tame | 297/331 |
| 6,595,588 B2 | * | 7/2003 | Ellerich et al. | 297/331 |
| 6,655,738 B2 | * | 12/2003 | Kammerer | 297/331 |

* cited by examiner

*Primary Examiner*—Rodney B. White
(74) *Attorney, Agent, or Firm*—Harness, Dickey & Pierce, P.L.C.

(57) ABSTRACT

A seat adjustment mechanism includes at least one recliner mechanism, a latch mechanism, and a kneel mechanism. The recliner mechanism serves to articulate a seatback relative to a seat while the floor latch and kneel mechanisms provide for dumping and pivoting of a seat assembly respectively. In addition, a second recliner mechanism, second floor latch mechanism, and second kneel mechanism may be provided on an opposite side of the seat assembly. A first interlock mechanism operably couples the first recliner mechanism and first latch mechanism while a second interlock mechanism couples the second recliner mechanism and second kneel mechanism. The first and second interlock mechanisms prevent the first and second recliner mechanisms from rotating to a usable position if either the first floor latch mechanism or second kneel mechanism is not securely latched.

37 Claims, 22 Drawing Sheets

US 6,857,703 B2

FOLD, TUMBLE AND KNEEL SEAT ASSEMBLY

FIELD OF THE INVENTION

The present invention relates to a seat assembly and, more particularly, to integrated recliner, floor-latch, and kneel mechanisms for a seat assembly.

BACKGROUND OF THE INVENTION

Seat assemblies, such as those used in vehicles, generally include a recliner mechanism for enabling motion of a seatback relative to a seat. Many seat assemblies include the ability of being folded about a forward pivot to provide added floor space within a vehicle or access to an otherwise obstructed space. To enable reclining and stowing operation of the seat assembly, integrated recliner and floor-latch mechanisms are traditionally provided as an assembly. The floor-latch mechanism typically extends downward from the seat for selective engagement with a floor. Generally, actuation of a lever in a first direction enables reclining motion of the seatback relative to the seat. Further actuation of the lever releases the seat assembly from engagement with the floor to enable forward pivoting of the complete seat assembly.

In addition, some seat assemblies provide the ability to further articulate a seat such that the seat assembly articulates forward to further increase the cargo area behind the seat. To enable articulation of the seat assembly a kneel mechanism is traditionally provided such that actuation of a lever in a first direction actuates the kneel mechanism to allow the seat assembly to articulate forward or "kneel" relative to its design or upright position.

Traditional seat assemblies suffer from a disadvantage that even though the seat assembly may not be properly engaged with the floor or properly engaged in an upright position, the seatback is fully actuable and positionable relative to the seat. As can be appreciated, the floor latch mechanism or kneel mechanism may appear to be fully latched when returned to a usable position when in fact either may be in an unlatched condition. This is particularly true in the case of a kneeling function because the seat assembly is not drastically out of position from its fully latched and secure position. In either situation, an occupant may falsely believe that the seat assembly is properly secured to the floor via the floor-latch mechanism or secured in the upright position via the kneel mechanism and occupy the seat.

SUMMARY OF THE INVENTION

A seat adjustment mechanism includes at least one recliner mechanism, a latch mechanism, and a kneel mechanism. In one embodiment a first recliner mechanism is in operable communication with a first latch mechanism and a first kneel mechanism. The recliner mechanism serves to articulate a seatback relative to a seat while the floor latch and kneel mechanisms provide for dumping and pivoting of a seat assembly respectively. In addition, a second recliner mechanism, second floor latch mechanism, and second kneel mechanism may be provided on an opposite side of the seat assembly from the first recliner mechanism, first floor latch mechanism, and first kneel mechanism.

A first interlock mechanism operably couples the first recliner mechanism and first latch mechanism while a second interlock mechanism couples the second recliner mechanism and second kneel mechanism. The first and second interlock mechanisms prevent the first and second recliner mechanisms from rotating to a usable position if either the first floor latch mechanism or second kneel mechanism is not securely latched. Further, the first and second recliner mechanisms, first and second floor latch mechanisms, and first and second kneel mechanisms are in operable communication with one another such that if the first mechanism is in the latched position, the second mechanism will also be in the latched position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4b is a is a more detailed exploded view of particular components of FIG. 4a;

FIG. 5b is a is a more detailed exploded view of particular components of FIG. 5a;

FIG. 6b is a is a more detailed exploded view of particular components of FIG. 6a;

DETAILED DESCRIPTION OF THE PREFERRED EMBODIMENTS

The following description of the preferred embodiment is merely exemplary in nature and is in no way intended to limit the invention, its application, or uses.

Figure 1:
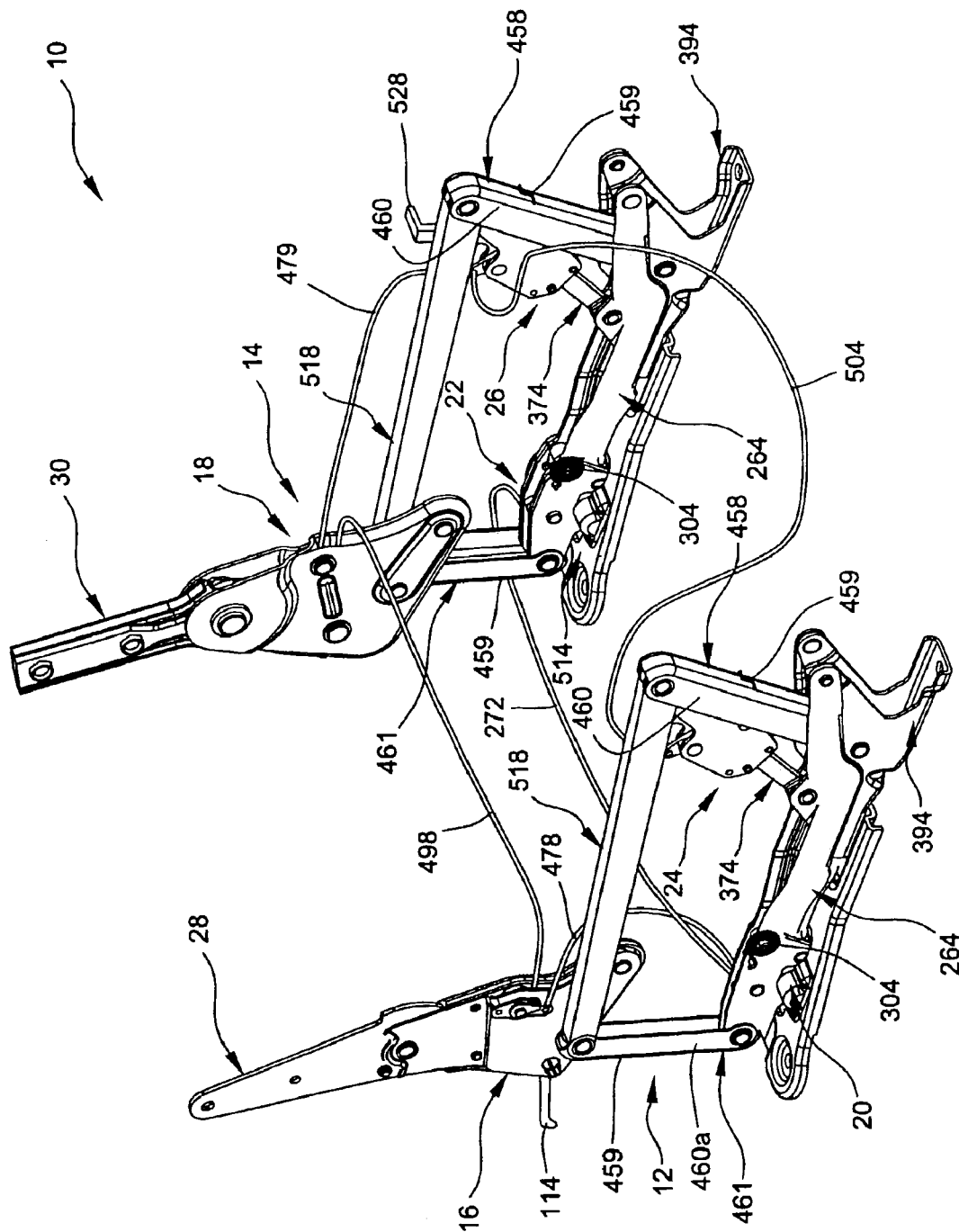
FIG. 1 is a perspective view of a recliner, floor-latch, and kneel assembly in accordance with the principles of the present invention.
Figure 2:
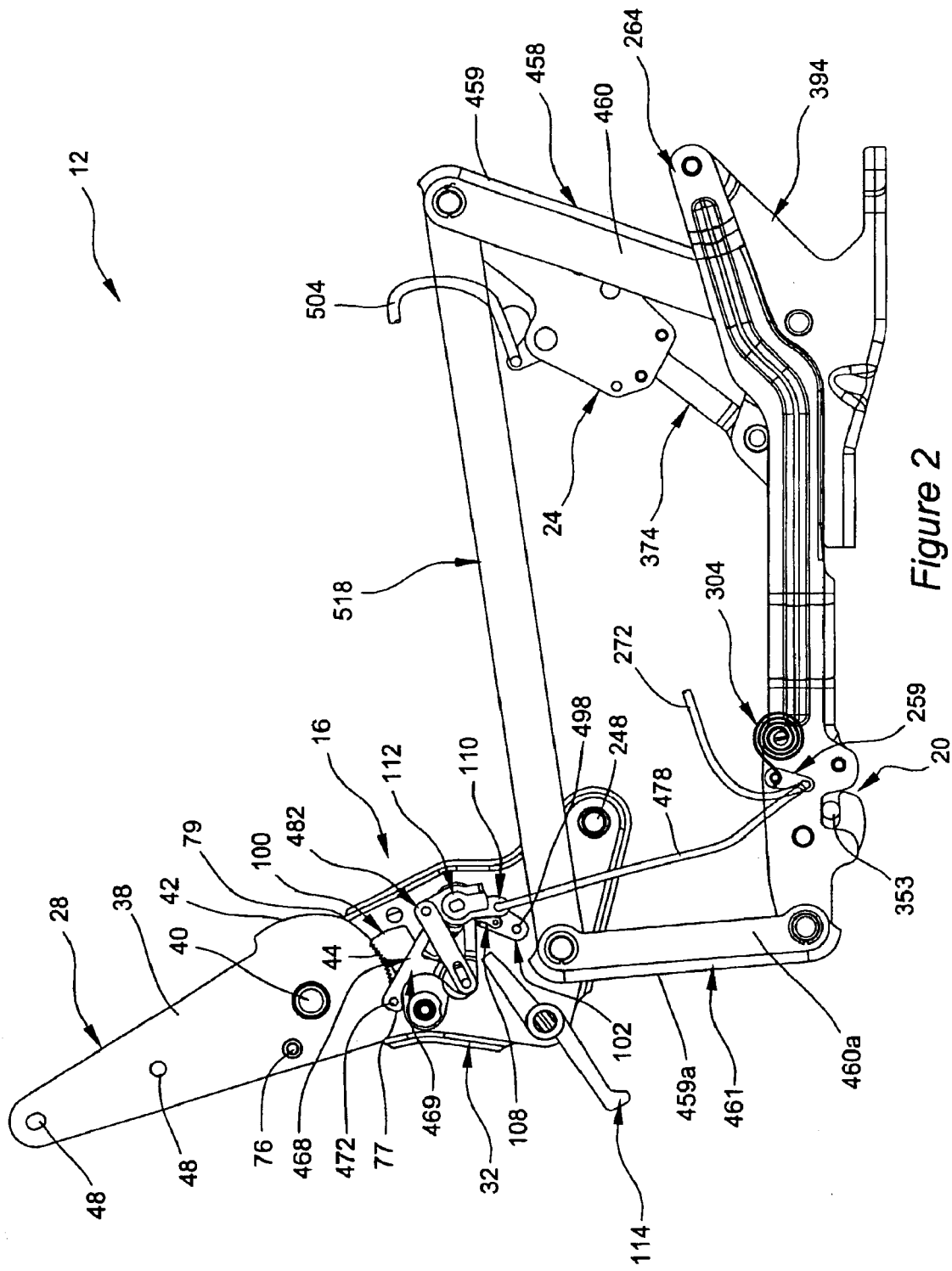
FIG. 2 is a side view of a first half of the recliner, floor-latch, and kneel assembly of FIG. 1 having an outer plate removed.
Figure 3:
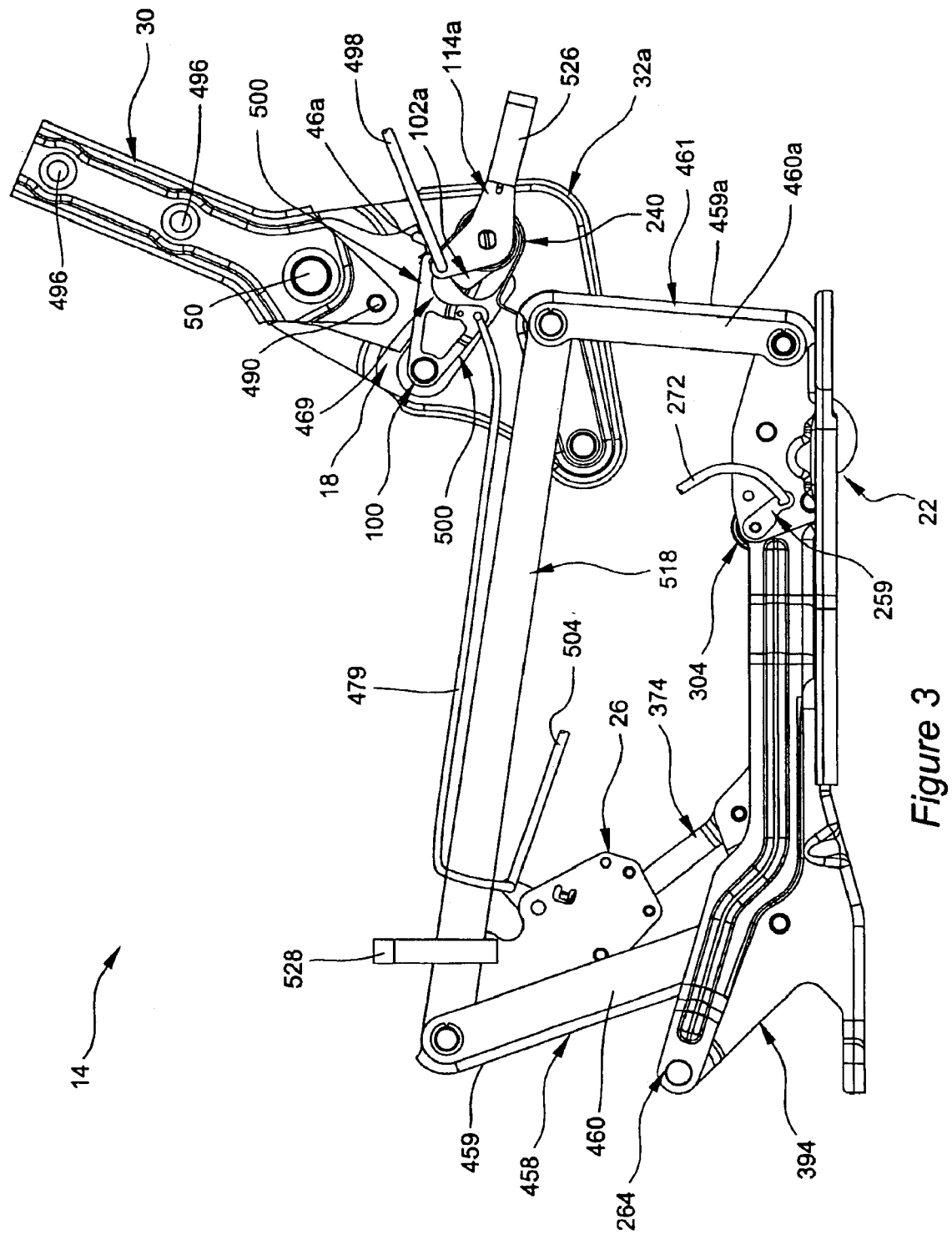
FIG. 3 is a side view of a second half of the recliner, floor-latch, and kneel assembly of FIG. 1 having an outer plate removed.
Figure 13A:
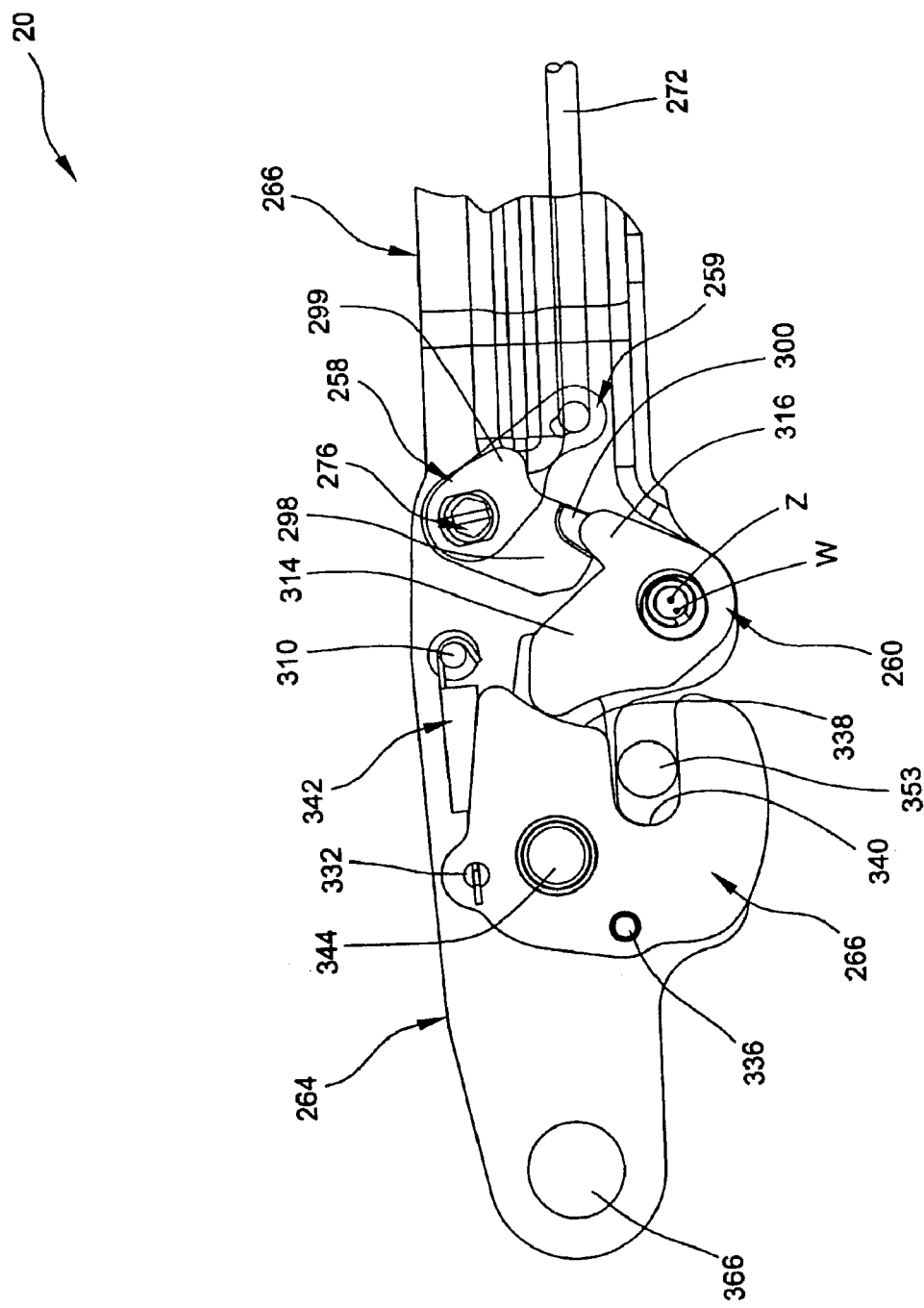
FIG. 13a is a side view of the latch mechanism with part of a housing removed to show the internal workings of the latch mechanism in the latched position.
Figure 13B:
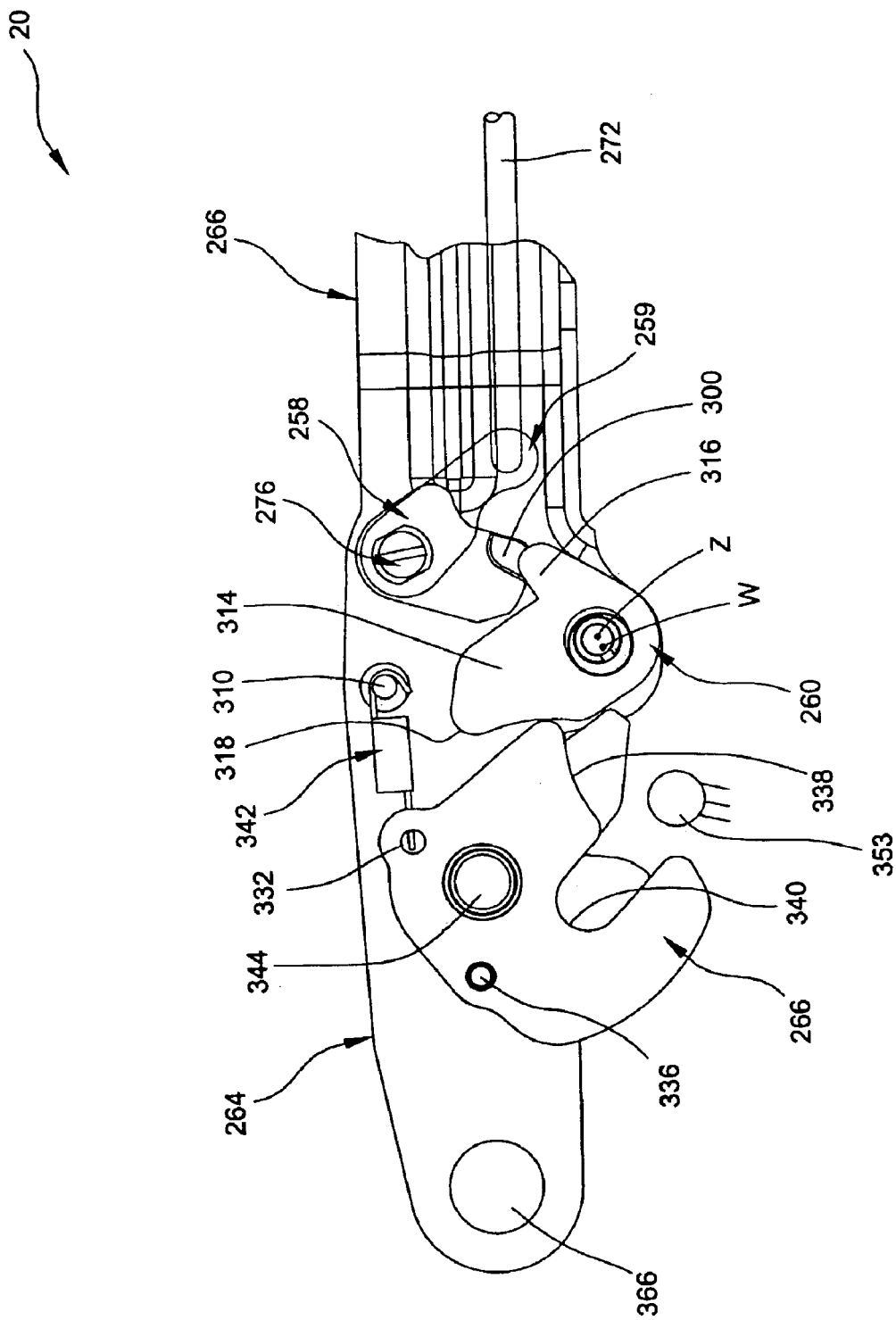
FIG. 13b is a side view of the latch mechanism with part of a housing removed to show the internal workings of the latch mechanism in the unlatched position.
Figure 14A:
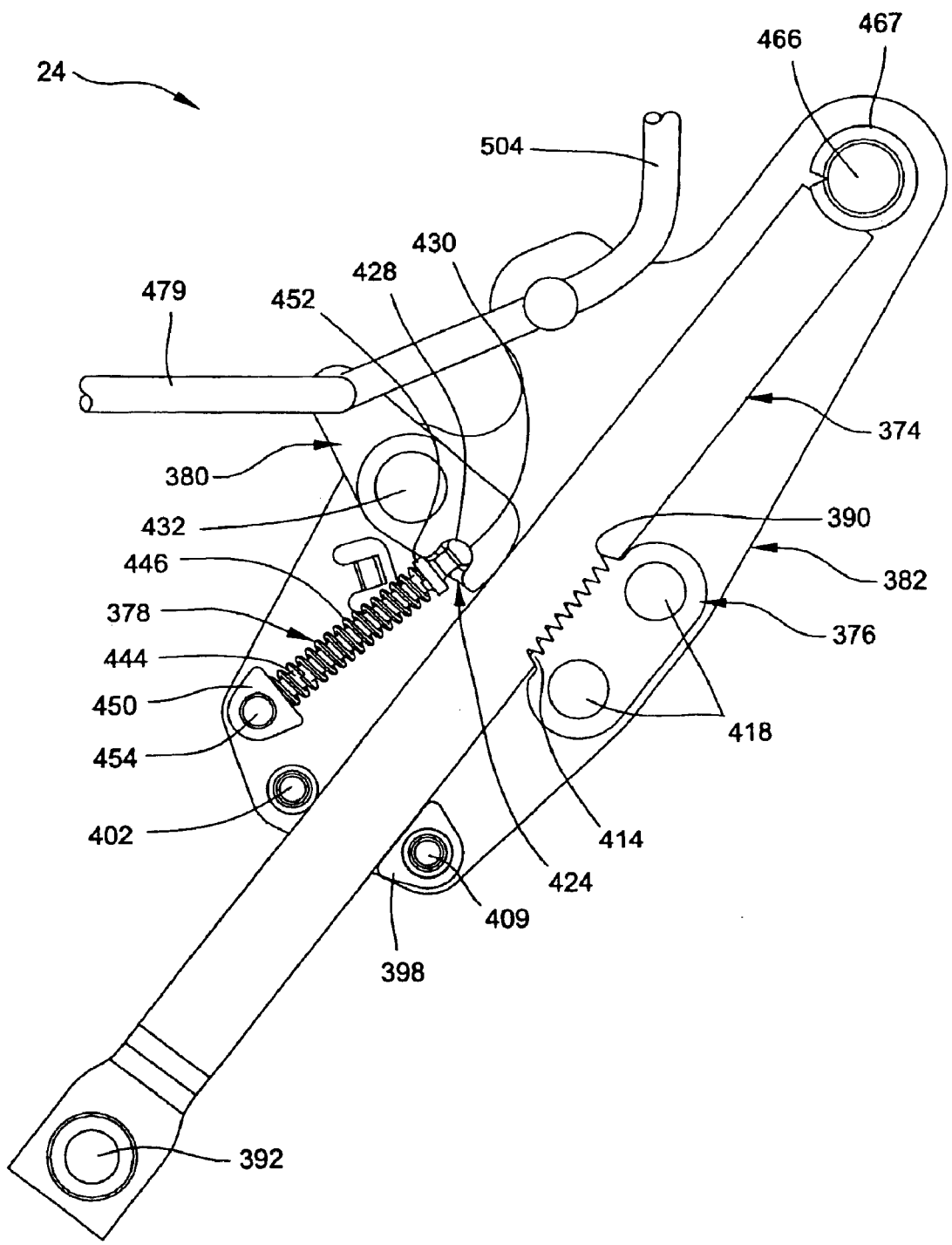
FIG. 14a is a side view of the kneel mechanism with part of a housing removed to show the internal workings of the kneel mechanism in the latched position.
Figure 14B:
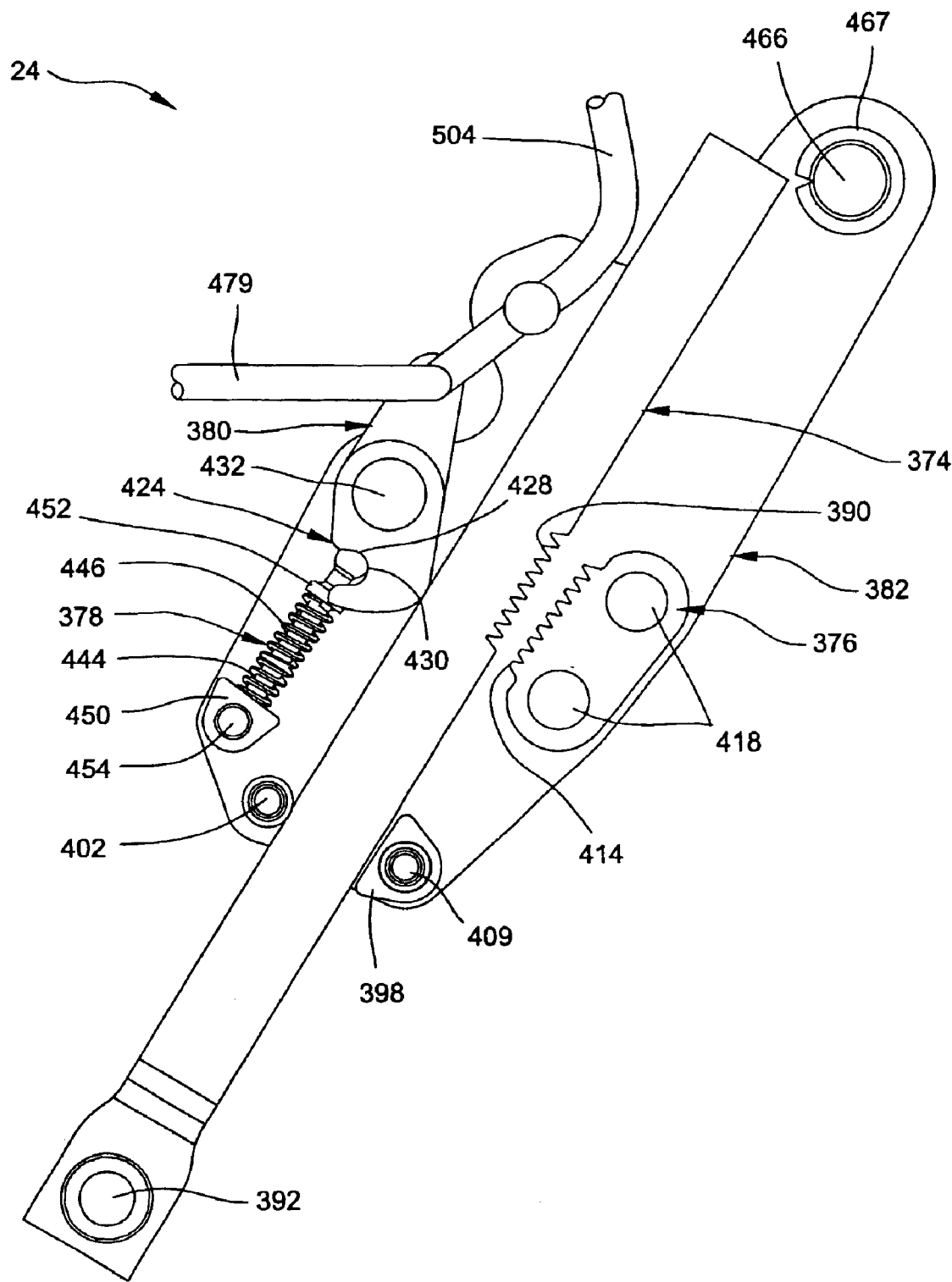
FIG. 14b is a side view of the kneel mechanism with part of a housing removed to show the internal workings of the kneel mechanism in the unlatched position.
Figure 17:
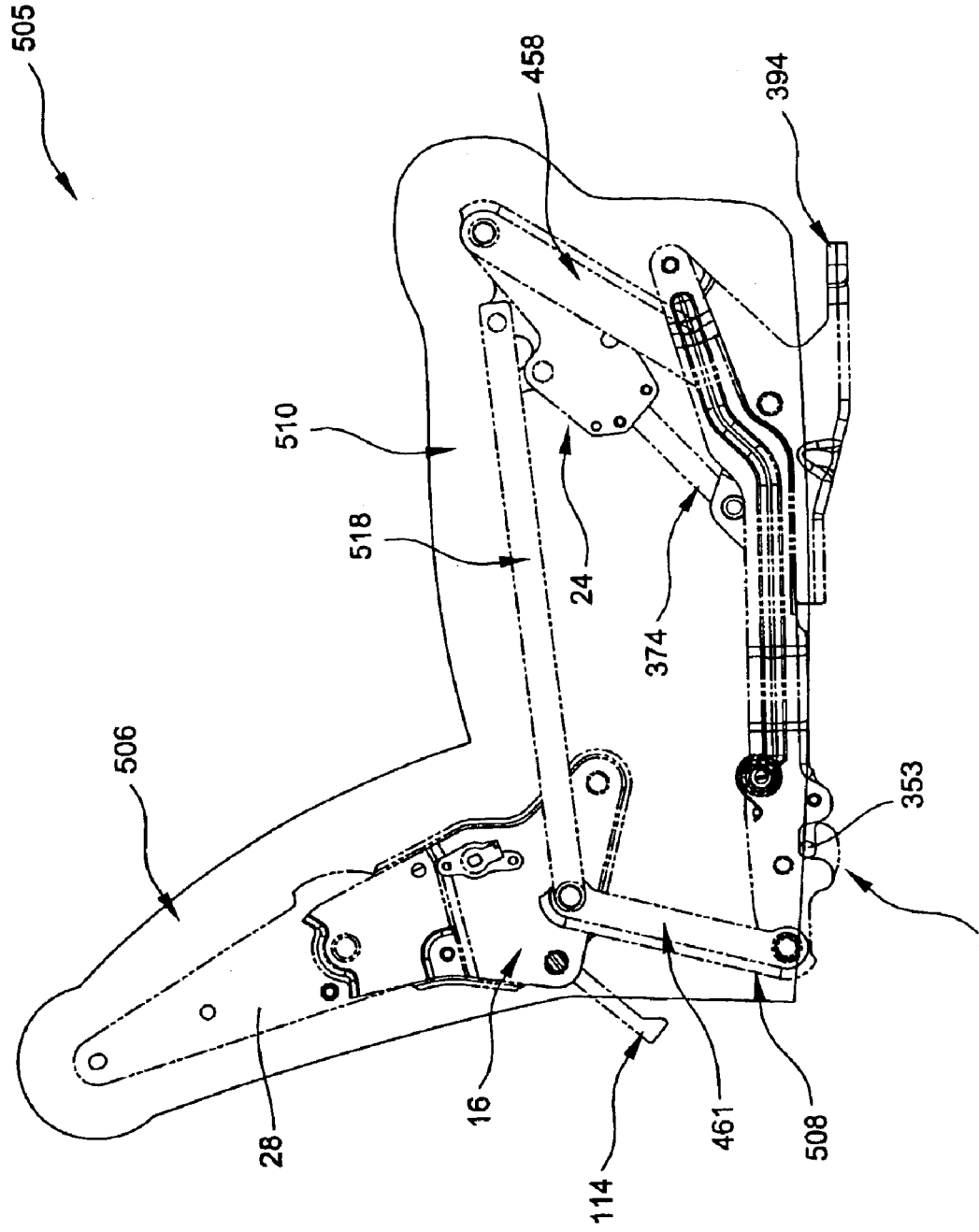
FIG. 17 is a side view of the seat assembly in the kneeled position.

With reference to FIGS. 1 through 3, a combination recliner, floor-latch, and kneel (RFK) assembly 10 for use with a seat assembly and operable in a first mode to enable recline or forward folding of a seat back relative to a seat, in a second mode to enable both forward folding of a seat back relative to a seat and forward dumping of a seat assembly, and in a third mode to allow forward articulation of a seat assembly or "kneeling". The RFK assembly 10 includes operably interconnected first and second RFK halves 12,14 respectively including first and second recliner mechanisms 16,18, first and second floor-latch mechanisms 20,22, and first and second kneel mechanisms 24,26. Also provided are upward extending seatback supports 28,30 operably interconnected with the recliner mechanisms 16,18 for selectively positioning the seatback supports. The floor-latch mechanisms 20,22 selectively engage a pair of strikers 353 disposed on a floor for securing the seat assembly thereto, as shown in FIGS. 13a and 13b and discussed in further detail below. Kneel mechanisms 24,26 selectively engage a pair of cross-members pivotably supported on a seat structure for securing the seat in an upright position, as shown in FIGS. 14a, 14b and FIG. 17 as discussed in further detail below.

The first RFK half 12 includes inner and outer plates 32,34 between which the first recliner mechanism 16 is operably supported. The first seatback support 28 is pivotally supported between the inner and outer plates 32,34 and is in selective engagement with the recliner mechanism 16 for pivotally positioning the first seatback support 28. An actuation lever 114 is pivotally supported between the inner and outer plates 32,34 and is in operable engagement with the first recliner mechanism 16 and the first floor-latch mechanism 20, as well as the second recliner mechanism 18 of the second RFK half 14 as will be discussed in more detail below.

The first seatback support 28 includes a generally triangular-shaped plate 38 having a pivot aperture 40 therethrough and an arcuate edge 42. A portion of the arcuate edge 42 includes a plurality of teeth 44 formed therein and an interlock notch 46. Auxiliary apertures 48 are provided for attachment of a seatback frame (not shown) thereto. The seatback support 28 is pivotally supported between the inner and outer plates 32,34 by a seatback support pivot 50. The seatback support pivot 50 includes a disc end 52, a keyed cylindrical section 54, a first cylindrical section 56 having a bearing surface 58, a second cylindrical section 60, and a third cylindrical section 62 having a diametric notch 64 formed therein. The support pivot 50 is received through a keyed aperture 66 of the inner plate 32, the pivot aperture 40 of the first seatback support 28 and a pivot aperture 68 of the outer plate 34. The keyed cylindrical section 54 aligns with the keyed aperture 66 of the inner plate 32 for fixing the support pivot 50 from rotating relative to the inner and outer plates 32,34. The first cylindrical section 56 aligns within the pivot aperture 40 of the first seatback support 28, whereby the first seatback support 28 pivots on the bearing surface 58. The second cylindrical extension 60 aligns with the pivot aperture 68 of the outer plate 34 and the third cylindrical section 62 extends from the disc end 52.

The first seatback support 28 is biased by a coil spring 70 including a central flat 72 that engages the diametric notch 64 of the third cylindrical section 62 and an outwardly extending arm 74 that engages a post 76 extending from the first seatback support 28 through attachment aperture 75. The post 76 includes a central cylindrical section 81 having two cylindrical sections 83 extending therefrom for interaction with the inner and outer plates 32,34 as will be discussed further below. In this manner, as the first seatback support 28 is caused to pivot clockwise (CW) relative to the view shown in FIG. 2, the cylindrical section 83 of the post 76 engages the extending arm 74 to bias against the reclining motion.

The first seatback support 28 further includes a sector plate 84 for interaction with the first floor latch mechanism 20 as will be discussed further below. The sector plate 84 includes an attachment aperture 86 formed therethrough for rotatably receiving the support pivot 50, and a cam surface 88. The cam surface 88 includes a first reaction surface 90, a second reaction surface 92, an arcuate surface 94 disposed generally between the first and second reaction surfaces. The sector plate 84 is fixedly attached to the first seatback support 28 by post 76 for rotation therewith.

As the first seatback support 28 is caused to pivot relative to the inner and outer plates 32,34, the post 76 may abut the inner and outer plates 32,34 at a first stop 77 during reclining or counterclockwise (CCW) rotation relative to the view shown in FIG. 2 to prohibit further pivotal motion of the first seatback support 28 relative to the inner and outer plates 32,34. During forward pivoting or clockwise (CW) rotation of the first seatback support 28 relative to the view shown in FIG. 2, the post 76 may abut the second stop 79 and prevent further forward movement of the first seatback support 28 relative to the inner and outer plates 32,34. In this manner, a range of pivotal motion of the first seatback support 28 is defined.

The first recliner mechanism 16 includes a pawl 100, a recliner cam 102, a main pivot 104, a trigger plate 106, a latch cam 108, a latch link 110, a key 112, and an actuation lever 114. The pawl 100 includes first and second extensions 116,118 and an attachment aperture 120. The first extension 116 includes a plurality of teeth 122 for selective engagement with the teeth 44 of the first seatback support 28 for defining a plurality of pivotal positions (i.e., recline positions) of the seat-back support 28 relative to the inner and outer plates 32,34 and an engagement face 124 for interaction with the recliner cam 102 as will be described further below. The second extension 118 includes an engagement face 126 and is generally opposite the engagement face 122 such that a cam recess 128 is defined therebetween.

Figure 4A:
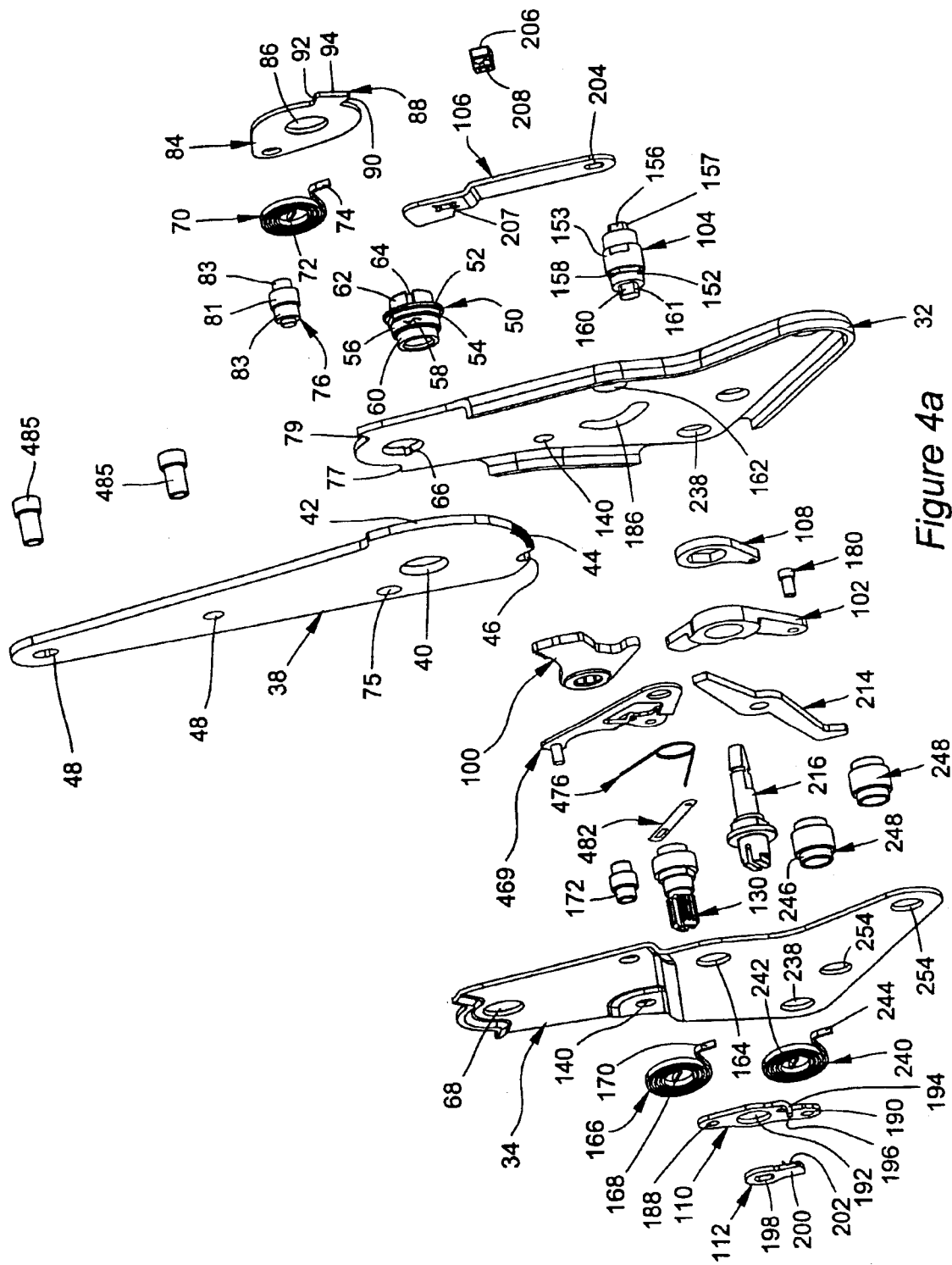
FIG. 4a is an exploded view a first recliner mechanism of the recliner, floor-latch, and kneel assembly.
Figure 4B:
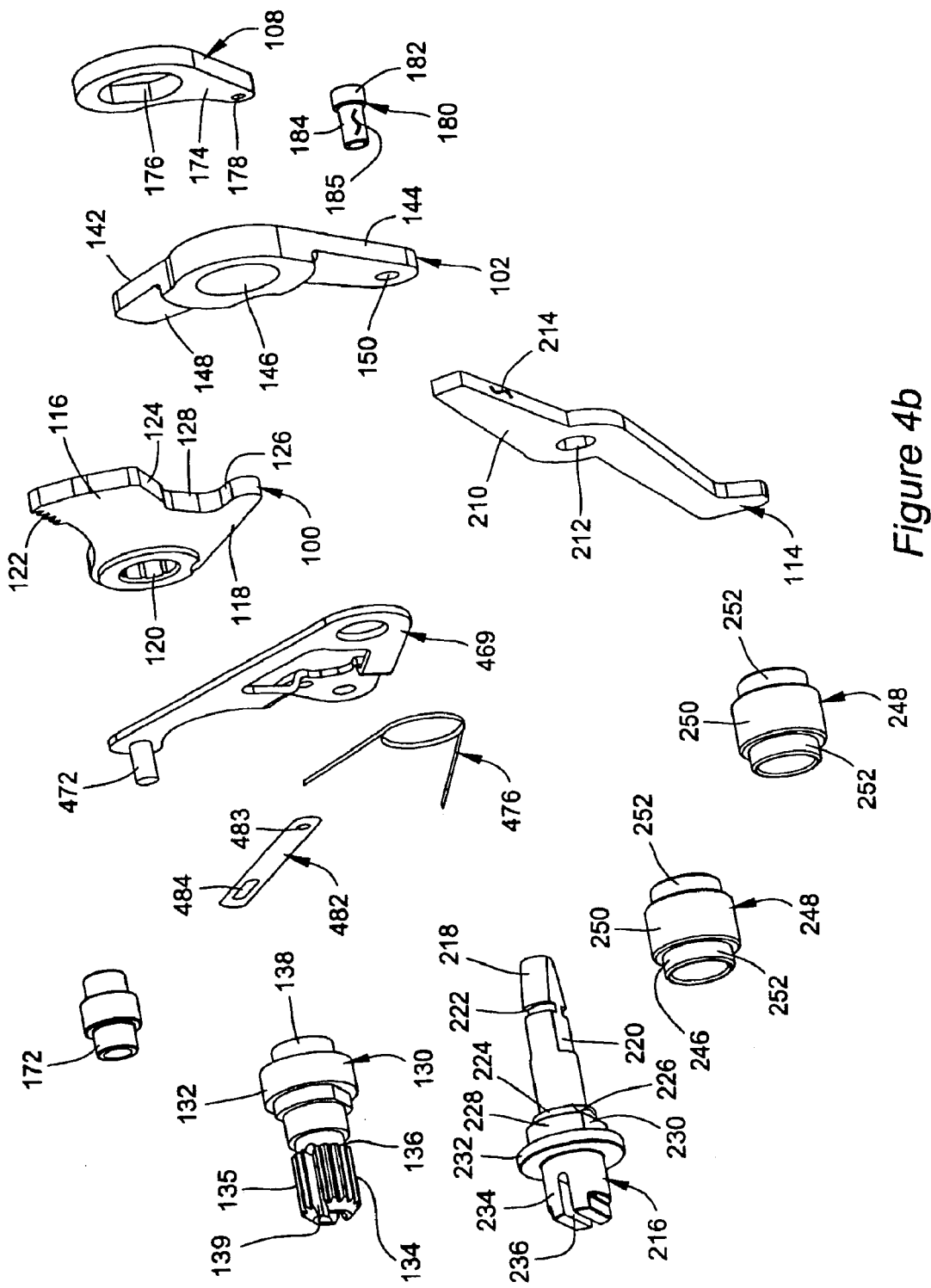

The pawl 100 is pivotably supported between inner and outer plates 32,34 by a pivot 130 whereby pivot 130 includes a central cylindrical section 132 flanked by first and second cylindrical sections 136,138, whereby the first cylindrical section 136 includes an engagement surface 134. The central cylindrical section 132 serves as a spacer between the inner and outer plates 32,34. The first cylindrical section 136 is received by the attachment aperture 120 such that the pawl 100 is restricted from rotating about engagement surface 134 while the first and second cylindrical sections 136,138 are rotatably attached to the inner and outer plates 32,34 through apertures 140. Relative rotation between the pawl 100 and the attachment aperture 120 is accomplished by a splined connection 135 as shown in FIGS. 4a and 4b. While the splined connection 135 is disclosed, any other suitable means of preventing relative rotation between the pawl 100 and the pivot 130 such as welding are anticipated and should be considered within the scope of the present invention. The first cylindrical section 136 further includes a spring slot 139 generally formed along its length for attachment to coil spring 166. Coil spring 166 includes a central flat 168 received by spring slot 139 and an extension 170 abutting spring post 172 which is fixedly attached to the inner plate 32 such that the coil spring 166 biases the pawl 100 in a first rotational direction (counterclockwise (CCW) as shown in FIG. 2).

The recliner cam 102 is a generally flat member having first and second extensions 142,144 and an attachment aperture 146 formed therethrough. The first extension 142 includes a reaction surface 148 for interaction with engagement faces 124 and 126 of pawl 100 while the second extension 144 includes a cable aperture 150 for communication with the second recliner mechanism 18, as will be described further below.

The latch cam 108 is a generally flat member having a first extension 174 and a keyed attachment aperture 176 formed therethrough. The first extension 174 includes a pin aperture 178 at its distal end for receiving a pin 180. Pin 180 includes first and second cylindrical sections 182,184, whereby the first cylindrical section 182 is slidably received by slot 186 of inner plate 32 such that slot 186 defines the range of motion of pin 180 and subsequently the latch cam 108. The second cylindrical section 184 includes a bearing surface 185 and is fixedly received into pin aperture 178. The second cylindrical section 184 extends generally through the latch cam 108 towards the outer plate 34 for interaction with the actuation lever 114.

The latch link 110 is an elongate generally flat member having a an attachment aperture 188, a cable aperture 190, a central attachment aperture 192, and a tab 194 for interaction with the key 112. The central attachment aperture 192 receives the main pivot 104 for pivotal support between the inner and outer plates 32,34. The attachment aperture 188 and cable aperture 190 are generally disposed at opposite ends of the latch link 110 having the central attachment aperture 192 disposed therebetween. The tab 194 extends from the latch link 110 generally towards outer plate 34 and includes an engagement face 196 for interaction with the key 112 as will be discussed further below.

The key 112 includes a keyed attachment aperture 198 and an extension 200 having an engagement face 202. The key 112 is fixedly received by the main pivot 104 such that rotation therebetween is prohibited. As such, when the main pivot 104 is caused to rotate sufficiently in the second rotational direction (CW as shown in FIG. 2), the tab 112 rotates therewith. Sufficient rotation of the key 112 causes the engagement face 202 to contact the tab 194 and subsequently rotate the latch link 110.

The trigger plate 106 includes a first end having an attachment aperture 204 and a second end having a pin 206 attached thereto. The attachment aperture 204 fixedly receives the main pivot 104 which when rotated, cause the trigger plate 106 to rotate therewith. The pin 206 includes a reaction face 208 for interaction with the sector plate 84 and is press fit into a notch 207 on the trigger plate 106. While the present invention discloses a pin 206 press fit to the trigger plate 106, other suitable methods of fixedly attaching the pin 206 to the trigger plate 106 such as welding for forming together is anticipated and should be considered within the scope of the present invention.

The recliner cam 102 and latch link 110 are pivotably supported between the inner and outer plates 32,34 about the main pivot 104. The latch cam 108 and key 112 are supported between the inner and outer plates 32,34 by the main pivot 104 while the trigger plate 106 is fixedly supported on an outer surface of the inner plate 32 by the main pivot 104. It should be understood that the trigger plate 106, latch cam 108, and key 112 are supported by the main pivot 104 by the first, second, and third keyed extensions 156,158,160, respectively, and rotate as the main pivot 104 rotates while the recliner cam 102 and latch link 110 are free to rotate relative to the main pivot 104.

The main pivot 104 includes a central cylindrical section 152 having a bearing surface, a cylindrical section 153 acting as a spacer between the inner and outer plates 32,34, and first, second, and third keyed extensions 156,158,160. The first keyed extension 156 includes arcuate bearing surface 157 and is received through attachment aperture 162 of inner plate 32 while the third keyed extension 160 includes arcuate bearing surface 161 and is received through attachment aperture 164 of the outer plate 34 such that the main pivot 104 is permitted to rotate on bearing surfaces 157 and 161 relative to the inner and outer plates 32,34. The central cylindrical section 152 receives attachment aperture 146 of the recliner cam 102, whereby the recliner cam 102 is allowed to pivot about bearing surface 154 relative to the main pivot 104.

The actuation lever 114 generally includes a flat plate having a lever arm 210 and a keyed spindle aperture 212. The lever arm 210 includes a reaction surface 214, which interacts with the recliner cam 102 and the latch cam 108 for selective actuation of the first seatback support 28. The actuation lever 114 is pivotally supported between the inner and outer plates 32,34 by a spindle 216. The spindle 216 includes a conical cylinder section 218 having flats 220 and notches 222 formed therein, a second cylinder section 224 having a bearing surface 226, a keyed cylindrical section 228 having keys 230 formed therein, a central disc-shaped section 232 and a fourth cylindrical section 234 including a notch 236 formed therein. The spindle 216 is received through the spindle aperture 212, whereby the keys 230 of the keyed cylindrical section 228 align with keys of the spindle aperture 212 for prohibiting relative rotational motion of the spindle 216 within the spindle aperture 212. The spindle 216 is further disposed through a pair of support apertures 238 of the inner and outer plates 32,34, supporting the spindle 216 therebetween.

The actuation lever 114 is rotationally biased in a neutral position by a coil spring 240. The coil spring 240 includes a central flat 242 and an outwardly extending arm 244. The central flat 242 is received by the notch 236 of the fourth cylindrical section 234 and the extending arm 244 engages an anchor point 246 on the outer plate 34. As the actuation lever 114 is caused to rotate from the neutral position, the coil spring 240 biases the actuation lever 114 back towards the neutral position.

A spacer 248 is further provided for spacing the inner and outer plates 32,34. The spacer 248 includes a central cylindrical section 250 and side cylindrical sections 252. The side cylindrical sections 252 are received into apertures 254 of the inner and outer plates 32,34, whereby the spacer 248 is supported therebetween. A width of the central cylindrical section 250 defines a distance between the inner and outer plates 32,34.

Figure 6A:
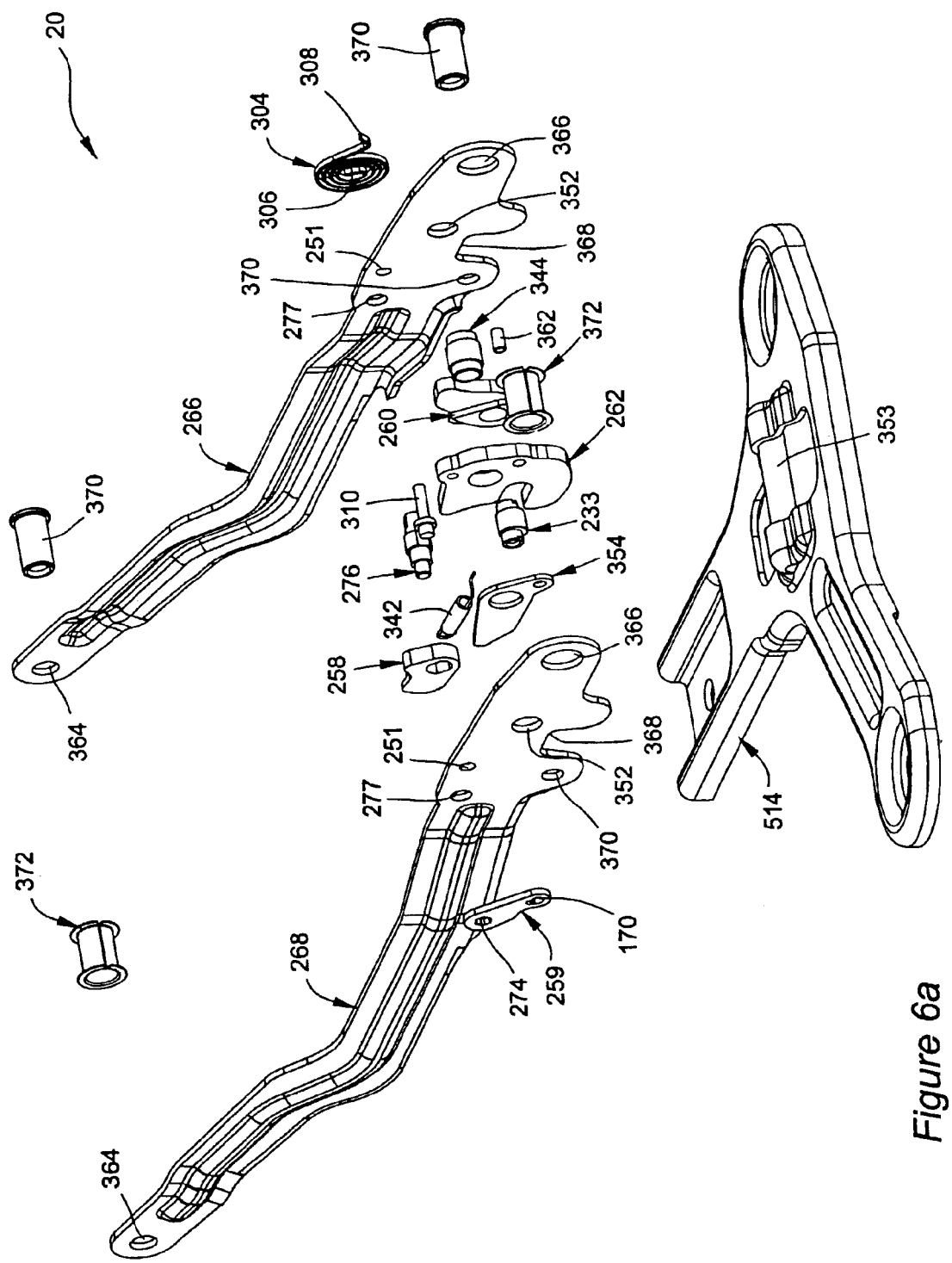
FIG. 6a is an exploded view of the latch mechanism of the recliner, floor-latch, and kneel assembly.
Figure 6B:
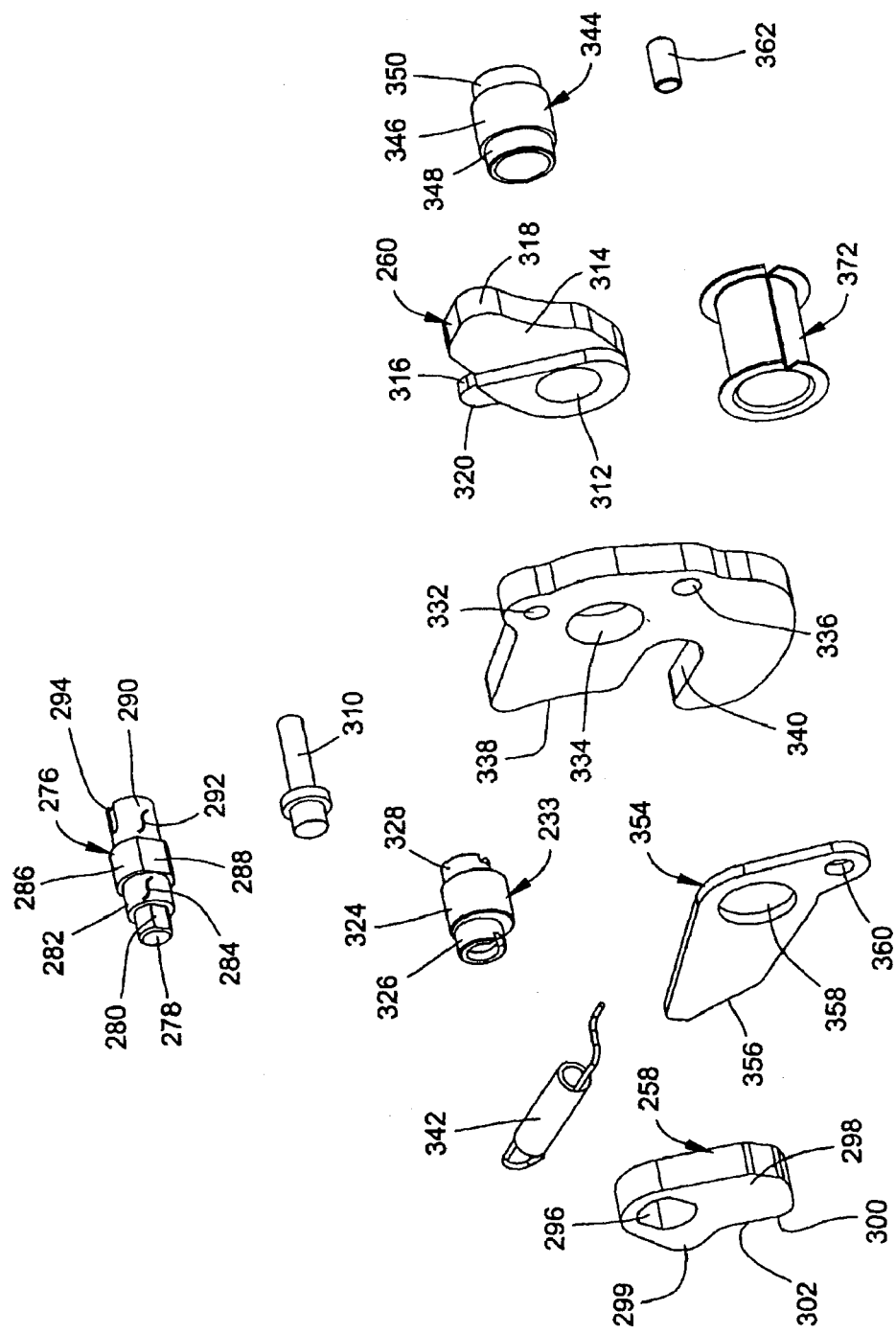

As best shown in FIGS. 6a and 6b, the first floor latch mechanism 20 includes an actuation lever 259, an actuation cam 258, a latch cam 260, a latch 262, and a housing 264 having first and second housing plates 266,268. The actuation lever 259 includes a cable aperture 170 which receives a first cable 478 for communication with the first recliner mechanism 16 and a second cable 272 for communication with the second floor latch mechanism 22 as will be described further below. Specifically, the first cable 478 is received by the cable aperture 190 of the latch link 110 and communicates with the first recliner mechanism 16 to selectively prevent actuation of the first seatback support 28 if either of the first and second floor latch mechanisms 20,22 are in an unlatched position as will be discussed further below.

The actuation lever 259 further includes a keyed aperture 274 for receiving pivot 276. Pivot 276 includes a first cylindrical section 278 having flats 280 formed thereon, a second cylindrical section 282 having a bearing surface 284, a third cylindrical section 286 having flats 288, and a fourth cylindrical section 290 having a bearing surface 292 and a slot 294 formed longitudinally therethrough. The keyed aperture 274 of the actuation lever 259 receives the first cylindrical section 278 of pivot 276 whereby flats 280 matingly receive the keyed aperture 274 to prevent relative rotation between the pivot 276 and the actuation lever 259.

The actuation cam 258 is a generally flat member having a keyed attachment aperture 296 and first and second extensions 298,299. The keyed attachment aperture 296 matingly receives the third cylindrical section 286 of pivot 276, whereby flats 288 cooperate with the keyed aperture 296 to prevent relative rotation therebetween. The second and fourth cylindrical sections 282,290 of pivot 276 are received into apertures 277 of the first and second housing plates 266,268 thus enabling the actuation cam 258 to rotate on bearing surfaces 284,292 relative to the housing 264. The first extension 298 further includes a recess 300 having an engagement face 302 disposed generally opposite the keyed attachment aperture 296 for interaction with the latch cam 260 while the second extension 299 selectively engages the actuation cam 258 as will be discussed further below.

The actuation cam 258 is biased by a coil spring 304 in a second rotational direction (clockwise (CW) as shown in FIGS. 13a and 13b). The coil spring 304 is disposed on an outside face of the first housing plate 266 and includes a central flat 306 that engages the longitudinal slot 294 formed in the fourth cylindrical section 290 and an outwardly extending arm 308 that engages a post 310 extending from the first housing plate 266 through aperture 251. In this manner, the actuation cam 258 is caused to pivot clockwise (CW) as shown in FIGS. 13a and 13b towards a latched position, whereby the post 310 engages the extending arm 308 to bias against rotation in a counterclockwise direction (CCW) towards an unlatched position. As such, the actuation cam 258 is biased into a latching position such that a sufficient force must be applied to overcome the bias of coil spring 304 to unlatch the first floor latch mechanism 20.

The latch cam 260 includes a central attachment aperture 312 and first and second extensions 314,316. The first extension 314 includes an engagement face 318 for selective engagement with the latch 262, while the second extension 316 includes a reaction face 320 for selective interaction with the second extension 299 of the actuation cam 258. The latch cam 260 is pivotably supported between the first and second housing plates 266,268 by a pivot 233, which includes a central cylindrical section 324 with first and second cylindrical sections 326,328 axially extending therefrom, each having bearing surfaces. The first and second cylindrical sections 326,328 are received into apertures 370 of the first and second housing plates 266,268, to rotatably support the first and second cylindrical sections 326,328 therebetween. The central cylindrical section 324, which is of a larger diameter than the first and second cylindrical sections 326,328, is press fit into the central attachment aperture 312 of the latch cam 260. Further, a center axis W of the central cylindrical section 324 is offset from a central axis Z of the first and second cylindrical sections 324,326, as best shown in FIGS. 13a and 13b. Thus, as the latch cam 260 is caused to pivot, pivotal motion thereof is supported by pivot 322, whereby axis W rotates about the central axis Z. In this manner, the latch cam 260 not only rotates between the first and second housing plates 266,268, but also shifts therebetween. As such, the latch cam 260 is biased towards engagement with the latch 262 due to the aforementioned shift accomplished by pivot 322 and by the overall difference in size between the larger first extension 314 and the smaller second extension 316.

The latch 262 is a flat plate including a spring aperture 332, a pivot aperture 334, an attachment aperture 336, a reaction face 338, and a striker recess 340. The spring aperture 332 provides an attachment for a latch spring 342, whereby the latch spring 342 is attached to the housing 264 at post 310 and biases the latch 262 in the second rotational direction. The pivot aperture 334 receives a latch pivot 344 therethrough for pivotably supporting the latch 262. The latch pivot 344 includes a central cylindrical 346 section with first and second cylindrical sections 348,350 axially extending therefrom, each having bearing surfaces. The first and second cylindrical sections 348,350 are received into apertures 352 of the first and second housing plates 266,268 and are pivotably supported therebetween. The central cylindrical section 346 is received through the pivot aperture 334 of the latch 262. The striker recess 340 is formed to selectively receive a striker 353 therein, as discussed in detail herein below. The reaction face 338 of the latch 262 is selectively engaged by engagement face 318 of the latch cam 260 to retain the latch 262 in a closed or latched position. This engagement prohibits movement of the latch 262, thereby preventing the latch 262 from rotating.

The latch 262 further includes a latch plate 354 having a reaction face 356, a pivot aperture 358, and an attachment aperture 360. The latch plate 354 lies adjacent to the latch 262, whereby the latch pivot 344 is received through the pivot aperture 358. A rivet 362 is provided and received through the attachment aperture 360 to fix the latch plate 354 for rotation with the latch 262. The latch plate 354 extends a distance over the reaction face 338 of the latch 262.

The housing 264 is a generally elongate member including a first end having an attachment aperture 364 and a second end having an attachment aperture 366, whereby the various latch components are disposed therebetween. The housing 264 further includes a latch recess 368 providing clearance for a striker 353 to interact with the first floor latch mechanism 20. The first and second ends receive a rivet 370 through their respective attachment apertures 364,366 to fixedly attach the first and second housing plates 266,268. In one embodiment, the first and second ends of the housing 264 receive support members as will be discussed further below. In this manner, the support members pivot about a collar 372 axially surrounding rivet 370.

Figure 7:
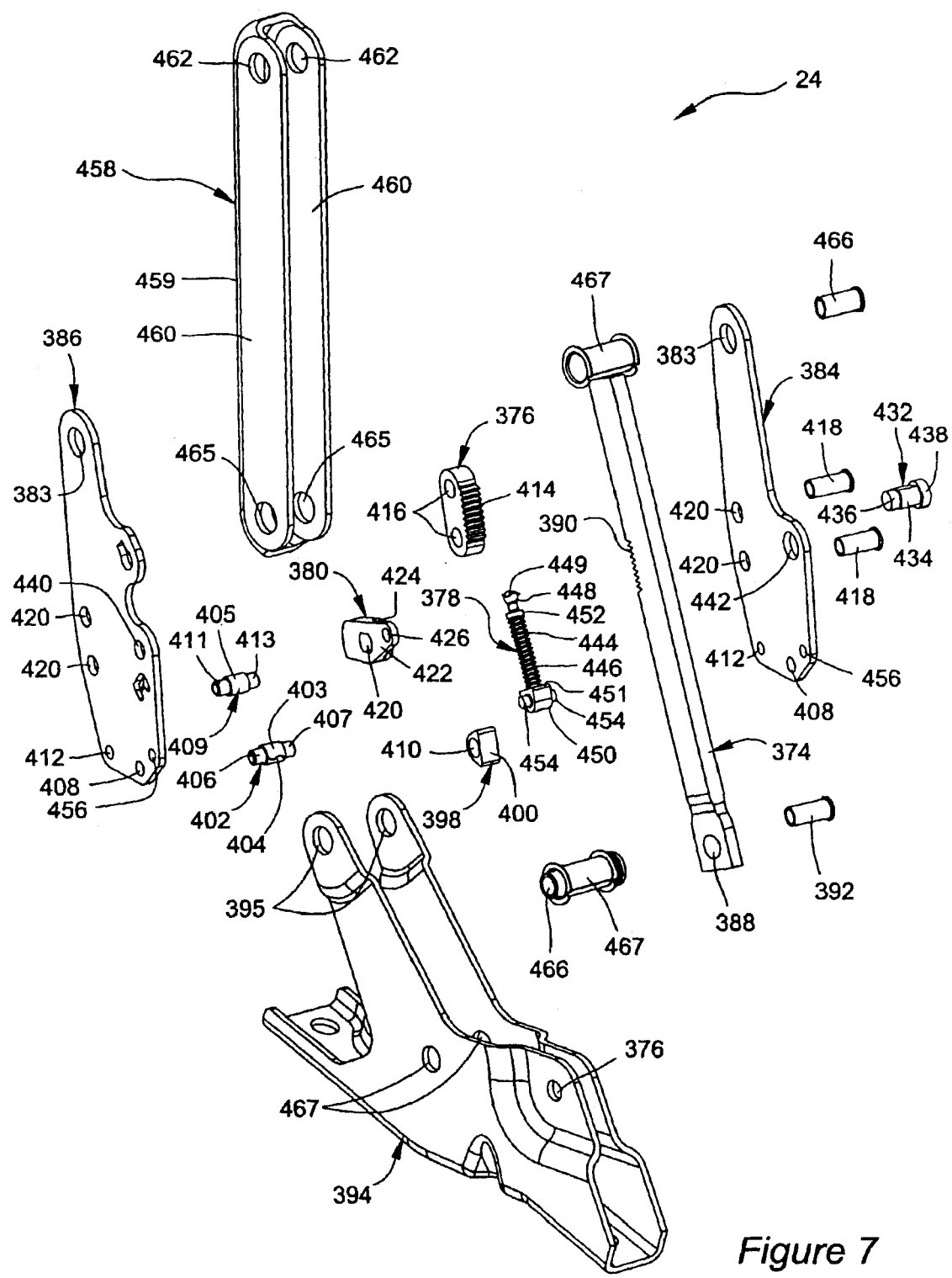
FIG. 7 is an exploded view of the kneel mechanism of the recliner, floor-latch, and kneel assembly.

The first kneel mechanism 24 includes a cross member 374, a locking pawl 376, a spring assembly 378, an actuation lever 380, and a housing 382 including first and second housing plates 384,386, as shown in FIG. 7. The cross member 374 is a generally flat member having an attachment aperture 388 at a first end and a plurality of teeth 390 for selective interaction with the locking pawl 376. The attachment aperture 388 receives rivet 392 to pivotably attach the cross member 374 to a lower bracket 394 through attachment apertures 376 of the lower bracket 394. A second end of the cross member 374 is slidably received into the housing 382, whereby movement of the cross member 374 within the housing 382 is bounded by a cross member guide 398 having a bearing surface 400 and a rivet 402. Rivet 402 includes a central cylindrical section 403 flanked by first and second cylindrical sections 406,407 and further includes a bearing surface 404 for interaction with the cross member 374. The first and second cylindrical sections 406,407 of rivet 402 are received into apertures 408 of the first and second housing plates 384,386, whereby the central cylindrical section 404 serves as a spacer therebetween.

The cross member guide 398 has a generally triangular shape and includes a central aperture 410 and bearing surface 400. The central aperture 410 of the cross member guide 374 receives the central section 405 of a second rivet 409, whereby the first and second cylindrical sections 411, 413 are received by apertures 412 of the housing 382 and serve to fixedly attach the first and second housing plates 384,386 while the central cylindrical section 405, in cooperation with the cross member guide 398, serves as a spacer therebetween. As previously mentioned, the cross member guide 398 and rivet 402 serve to restrict the movement of the cross member 374 within the housing 382. Specifically, the distance from bearing surface 400 to the central cylindrical section 403 of rivet 402 defines the range of motion that the cross member 374 is permitted to laterally move relative to the housing 382.

The locking pawl 376 is a generally flat member having a plurality of teeth 414 and attachment apertures 416 formed therethrough. Attachment apertures 416 are disposed opposite one another and receive rivets 418 to fixedly attach the locking pawl 376 to the housing 382 through apertures 420 of the inner and outer housing plates 384,386. The plurality of teeth 414 are disposed generally between apertures 416 as best seen in FIG. 7. The teeth 414 selectively engage the teeth 390 of the cross member 374 to selectively fix the cross member 374 to the housing 382 thus preventing relative movement therebetween.

The actuation lever 380 includes a keyed attachment aperture 420, an extension 422, and a recess 424 for interaction with the spring assembly 378. The extension 422 extends from the keyed attachment aperture 420 and includes a cable attachment aperture 426. The recess 424 is disposed generally at the base of the extension 422 and includes a socket 428 having a bearing surface 430 as best shown in FIGS. 14a and 14b. The keyed attachment aperture 420 receives a pivot 432 which rotatably supports the actuation lever 380 between the first and second housing plates 384,386. The pivot 432 includes a central keyed section 434 and first and second cylindrical sections 436, 438. The central keyed section 434 matingly receives the keyed attachment aperture 420 such that the actuation lever 380 is caused to rotate with pivot 432. The first cylindrical section 436 is rotatably received through aperture 440 of the first housing plate 384 while the second cylindrical section 438 is rotatably received through attachment aperture 442 of the second housing plate 386. In one embodiment, the second cylindrical section 438 receives an external handle 528 for manual manipulation of the actuation lever 380, as will be discussed further below. While an external handle 528 is disclosed, it should be understood that the actuation lever 380 could include an integral handle and should be considered within the scope of the present invention. Further, while an external handle 528 is disclosed as part of the first kneel mechanism 24, it should be understood that the external handle 528 could also be incorporated with the actuation lever 380 of the second kneel mechanism 26.

The spring assembly 378 includes an elongate post 444 and a spring 446. The post 444 has a ball 448 including a bearing surface 449 at a first end and a spring block 450 having a reaction surface 451 at a second end. The ball 448 further includes a collar 452 axially surrounding the post 444 for interaction with the spring 446. The spring block 450 further includes cylindrical posts 454 received by apertures 456 of the inner and outer housing plates 384,386 to fix the spring anchor 450 therebetween. The ball 448 is matingly received by the socket 428 for pivotal movement therein, whereby the bearing surface 430 of the socket 428 reacts against the bearing surface of the ball 448. Specifically, the spring 446 is disposed between the ball 448 and the spring block 450 such that a first end of the spring 446 reacts against the collar 352 of the ball 448 and a second end of the spring 446 reacts against the reaction surface 451 of the spring block 450 causing pivotal movement of the ball 448. In this manner, the spring 446 biases the actuation lever 380 into engagement with the cross member 374 and subsequently into a locked position.

The housing 382 is pivotably supported by a front support member 458 such that the housing 382 is allowed to pivot relative thereto. The front support member 458 is an elongate member having a front face 459 and includes integral side supports 460 formed therewith. The side supports 460 include a first set of apertures 462 at a first end that receive a pivot 466 having an axially surrounding collar 467, whereby the housing 382 rotates relative to the front support member 458 about collar 467. Specifically, the pivot 466 is received through apertures 383 of the inner and outer housing plates 384,386 such that the side supports 460 of the front support member 458 are disposed on an outer face of the inner and outer housing plates 384,386 respectively. The front support member 458 is rotatably attached to the lower bracket 394 at a second end through attachment apertures 467 of the lower bracket 394 and attachment apertures 465 of the front support member 458. Again, apertures 465 of the front support member 458 and apertures 467 of the lower bracket 394 receive a second pivot 466 having a second axially surrounding collar 467 such that the front support member 458 rotates relative to the lower bracket 394 about collar 467.

In this manner, the front support member 458 is allowed to pivot relative to the housing 382 and the lower bracket 394. Specifically, as the cross member 374 disengages the locking pawl 376 the housing 382 is free to rotate relative to the front support member 458. In addition, as the cross member 374 disengages the locking pawl 376, the front support member 458 is allowed to pivot relative to the lower bracket 394, allowing the housing 382 and the front support member 458 to articulate forward and concurrently move down as shown in FIG. 17.

The first RFK half 12 further includes a first interlock assembly 468 having an interlock plate 469 to prohibit positioning the first seat back support 28 in a use or upright position if either floor-latch mechanism 20,22 or either kneel mechanism 24,26 are not properly latched as shown in FIGS. 2, 4a, and 4b. The floor latch mechanisms 20,22 are considered in the latched position when securely latched to a striker 353 while the kneel mechanisms 24,26 are considered in the latched position when the locking pawl 376 is securely engaged to the cross member 374.

The interlock plate 469 is pivotally supported adjacent an outer surface of the first outer plate 34 by the main pivot 104 and includes an interlock post 472 selectively engagable with the seat-back support 28. A wire spring 476 is disposed about the interlock plate 469 to impart a bias force on the interlock plate 469. In this manner, the interlock post 472 is biased toward engagement with the seat-back support 28. However, a first interlock cable 478 operably interconnects the interlock plate 469 and the first floor latch mechanism 20 through the latch link 110. Specifically, the first interlock cable 478 is received through cable aperture 190 of the latch link 110 at a first end and received by the cable aperture 270 of the actuation lever 259 of the first floor latch mechanism 20. As the first interlock cable 478 is placed under tension, the latch link 110 rotates and thereby causes a link 482 to engage the interlock plate 269. The link 482 includes an attachment aperture 483 and a longitudinal slot 484. The latch link 110 is rotatably attached to the link 482 by a rivet 485 received through aperture 483 of the link 482 and aperture 188 of the latch link 110. The longitudinal slot is similarly attached to the interlock plate 469 by another rivet 485.

As explained in further detail below, tension on the first interlock cable 478 is present when both floor-latch mechanisms 20,22 are properly engaged, thereby rotating the latch link 110 and link 482 such that the interlock plate 269 is pulled against the bias of the spring 476 and enabling return of the seat-back support 28 from a forward-fold position to a use or upright position. If, on the other hand, either floor-latch mechanism 20,22 is not properly secure, the first interlock cable 478 is slack, causing the interlock plate 269 to bias into engagement with the seat-back support 28 by the wire spring 476. In this situation, return rotation of the seat-back support 28 from a forward-fold position causes the interlock post 472 to engage the interlock notch 46, thereby preventing return of the seat-back support 28 to a use or upright position.

The second RFK half 14 includes inner and outer plates 32a,34a between which the second recliner mechanism 18 is operably supported. The second seatback support 30 is pivotally supported between the inner and outer plates 32a,34a and is in selective engagement with the recliner mechanism 18 for pivotally positioning the second seatback support 30 as best shown in FIG. 3. An actuation lever 114a is pivotally supported between the inner and outer plates 32a,34a and is in operable engagement with the second recliner mechanism 18 as well as the first recliner mechanism 16 of the first RFK half 12. In view of the substantial similarity in structure and function of the components associated with the first RFK half 12 with respect to the second RFK half 14, like reference numerals are used hereinafter and in the drawings to identify like components while like reference numerals containing letter extensions are used to identify those components that have been modified.

Figure 5A:
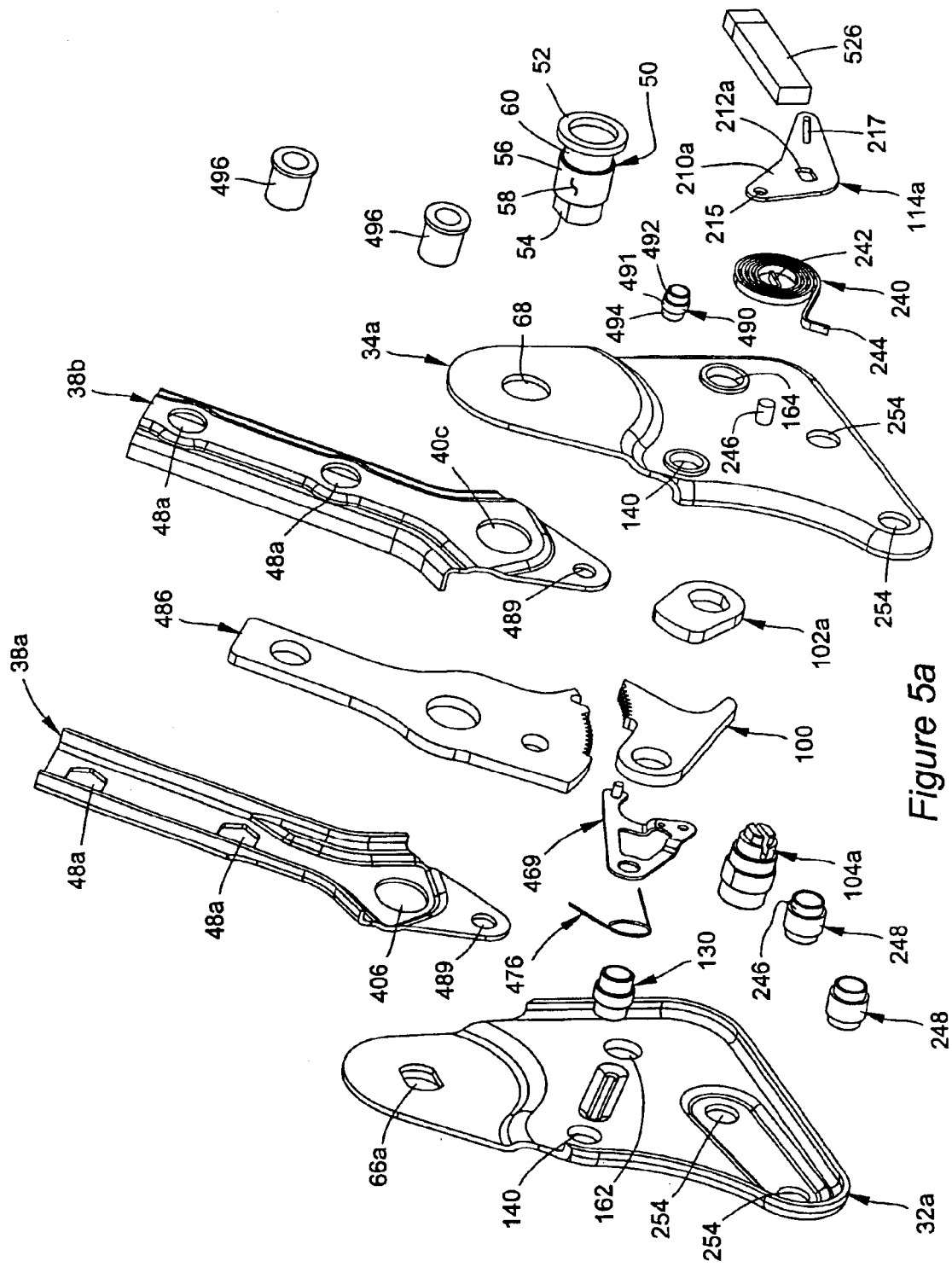
FIG. 5a is an exploded view the second recliner mechanism of the recliner, floor-latch, and kneel assembly.
Figure 5B:
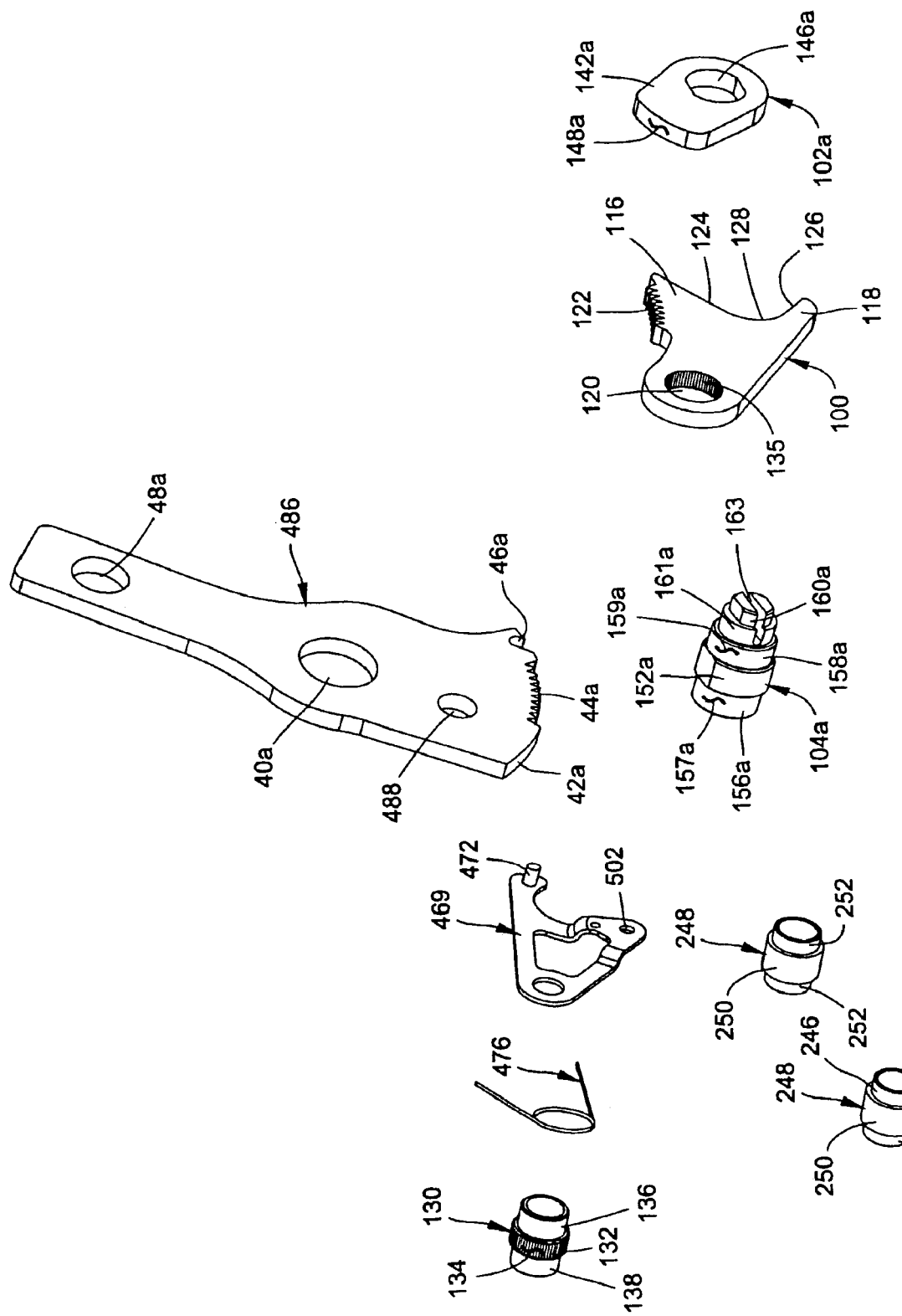

The second seatback support 30 includes first and second generally triangular-shaped housing plates 38a,38b and a locking plate 486 disposed therebetween as best shown in FIGS. 3, 5a, and 5b. Locking plate 486 is a generally flat member having a pivot aperture 40a, an attachment aperture 488, and an arcuate edge 42a. A portion of the arcuate edge 42a includes a plurality of teeth 44a formed therein and an interlock notch 46a. The first and second housing plates 38a,38b include pivot apertures 40b,40c and an attachment aperture 489. In addition, the locking plate 486 and the first and second housing plates 38a,38b include auxiliary apertures 48a for attachment of a seatback frame (not shown) thereto.

As previously discussed, the locking plate 486 is disposed between the first and second housing plates 38a,38b and is attached therebetween by a rivet 490 having a central cylindrical section 491 received by aperture 488 of the locking plate. Rivet 490 further includes first and second cylindrical sections 492,494 disposed on opposite sides of the central cylindrical section 491, whereby cylindrical sections 492,494 are received by attachment apertures 489 of the first and second housing plates 38a,38b such that the locking plate 486 is fixedly held therebetween. In addition, the central cylindrical section 491 has a larger diameter than that of the first and second cylindrical sections 492,494 and as such acts as a spacer between the first and second housing plates 38a,38b. In this manner, the locking plate 486 is fixed for rotation with the first and second housing plates 38a,38b. In addition, rivets 496 are received through auxiliary apertures of the first and second housing plates 38a,38b and the locking plate 486 to further fix the housing plates 38a,38b and the locking plate 486 together as best shown in FIGS. 3, 5a, and 5b.

The seatback support 30 is pivotally supported between the inner and outer plates 32a,34a by a seatback support pivot 50. The seatback support pivot 50 includes a disc end 52, a keyed cylindrical section 54, a first cylindrical section 56 having a bearing surface 58, and a second cylindrical section 60. The support pivot 50 is received through a keyed aperture 66a of the inner plate 32a, the pivot apertures 40b,40c of the first and second housing plates 38a,38b, the pivot aperture 40a of the locking plate 486, and a pivot aperture 68a of the outer plate 34a. The keyed cylindrical section 54 aligns with the keyed aperture 66a of the inner plate 32a for fixing the support pivot 50 from rotating relative to the inner and outer plates 32a,34a. The first cylindrical section 56 aligns within the pivot apertures 40b,40c of the first and second housing plates 38a,38b and the pivot aperture 40a of the locking plate 486, whereby the second seatback support 30 pivots on the bearing surface 58. The second cylindrical extension 60 aligns with the pivot aperture 68 of the outer plate 34a.

The second recliner mechanism 18 includes a pawl 100, a recliner cam 102a, a main pivot 104a, and an actuation lever 114a. The pawl 100 includes first and second extensions 116,118 and an attachment aperture 120. The first extension 116 includes a plurality of teeth 122 for selective engagement with the teeth 44a of the second seatback support 30 for defining a plurality of pivotal positions (i.e., recline positions) of the seat-back support 30 relative to the inner and outer plates 32a,34a and an engagement face 124 for interaction with the recliner cam 102a as will be described further below. The second extension includes an engagement face 126 and is generally opposite the engagement face 124 such that a cam recess 128 is defined therebetween.

The pawl 100 is pivotably supported between inner and outer plates 32a,34a by a pivot 130 whereby pivot 130 includes a central cylindrical section 132 having engagement surface 134 and is flanked by first and second cylindrical sections 136,138. The central cylindrical section 132 is received by the attachment aperture 120 such that the pawl 100 is restricted from rotating about engagement surface 134 while the first and second cylindrical sections 136,138 are rotatably attached to the inner and outer plates 32a,34a through apertures 140. Relative rotation between the pawl 100 and the attachment aperture 120 is accomplished by a splined connection 135 as shown in FIG. 5b. While the splined connection 135 is disclosed, any other suitable means of preventing relative rotation between the pawl 100 and the pivot 130 such as welding are anticipated and should be considered within the scope of the present invention.

The recliner cam 102a is a generally flat member having an extension 142a and a keyed attachment aperture 146a formed therethrough. The extension 142a includes a reaction surface 148a for interaction with engagement faces 124 and 126 of pawl 100. The recliner cam 102a is pivotably supported between the inner and outer plates 32a,34a about the main pivot 104a.

The main pivot 104a includes a central keyed section 152a flanked by first and second cylindrical sections 156a, 158a having bearings surfaces 157a,159a and a third keyed section 160a extending from a third cylindrical section 161a. The first cylindrical section 156a is received through attachment aperture 162 of inner plate 32a while the second cylindrical section 158a is received through attachment aperture 164 of the outer plate 34a such that the main pivot 104a is permitted to rotate on the first and second bearing surfaces 157a,159a relative to the inner and outer plates 32a,34a. The central cylindrical section 152a receives attachment aperture 146a of the recliner cam 102, whereby the recliner cam 102a is allowed to pivot relative to the housing plates 32a,34a. Specifically, the keyed attachment aperture 146a of the recliner cam 102a matingly receives the central keyed section 152a of the main pivot 104a to prevent relative rotation therebetween.

The third cylindrical section 161a is disposed adjacent the second cylindrical section 158a and extends generally through attachment aperture 164 of the outer plate 34a. The third keyed section 160a is disposed adjacent the third cylindrical section 161a and extends generally away from an outer surface of the outer plate 34a. The third cylindrical section 161 and third keyed section 160a further include a slot 163 extending generally therethrough for interaction with the actuation lever as will be discussed in further detail herein below.

The actuation lever 114a generally includes a flat plate having a lever arm 210a and a keyed aperture 212a. The lever arm 210a includes a cable attachment aperture 215 at a first end and a slot 217 at a second end. The cable attachment aperture receives a cable 498 for communication with the first recliner mechanism 16. Specifically, cable 498 interconnects the actuation lever 114a of the second recliner mechanism 18 and the recliner cam 102 of the first recliner mechanism 16 such that as one of either the recliner cam 102 or the actuation lever 114a is caused to rotate the other is also caused to rotate. In one embodiment the slot 217 is provided with a handle 526 for manual manipulation of the actuation lever 114a as will be discussed further below. The keyed aperture 212a is matingly received by the third keyed section 160a of the main pivot 104a such that the main pivot 104a is fixed for rotation with the actuation lever 114a.

The actuation lever 114a is rotationally biased in a neutral position by a coil spring 240. The coil spring 240 includes a central flat 242 and an outwardly extending arm 244. The central flat 242 is received by the slot 217 of the third cylindrical section 161a and the third keyed section 160a while the extending arm 244 engages an anchor point 246 on the outer plate 34a. As the actuation lever 114a is caused to rotate from the neutral position, the coil spring 240 biases the actuation lever 114a back towards the neutral position.

A spacer 248 is further provided for spacing the inner and outer plates 32a,34a. The spacer 248 includes a central cylindrical section 250 and side cylindrical sections 252. The side cylindrical sections 252 are received into apertures 254 of the inner and outer plates 32,34, whereby the spacer 248 is supported therebetween. A width of the central cylindrical section 250 defines a distance between the inner and outer plates 32a,34a.

The second RFK half 14 further includes a second interlock assembly 500 having an interlock plate 469 to prohibit positioning the second seat back support 30 in a use or upright position if either floor-latch mechanism 20,22 or either kneel mechanism 24,26 are not properly latched. The floor latch mechanisms 20,22 are considered in the latched position when securely latched to a striker 353 while the kneel mechanisms 24,26 are considered in the latched position when the locking pawl 376 is securely engaged to the cross member 374.

The interlock plate 469 is pivotally supported adjacent an outer surface of outer plate 34a by pivot 130 and includes an interlock post 472 selectively engagable with the seat-back support 30. A wire spring 476 is disposed about the interlock plate 469 to impart a bias force on the interlock plate 469. In this manner, the interlock post 472 is biased toward engagement with the seat-back support 30. However, a second interlock cable 479 operably interconnects the interlock plate 469 and the second kneel mechanism 26. Specifically, the second interlock cable 479 is received through a cable aperture 502 of the interlock plate 469 at a first end and received by the second kneel mechanism 26 at a second end. As the second interlock cable 479 is placed under tension, the interlock plate 469 rotates and thereby allows movement of the second seatback support.

As explained in further detail below, tension on the second interlock cable 479 is present when both kneel mechanisms 24,26 are properly engaged, thereby causing the interlock plate 269 to be pulled against the bias of the spring 476 and enabling return of the seat-back support 30 from a forward-fold position to a use or upright position. If, on the other hand, either kneel mechanisms 24,26 is not properly secure, the second interlock cable 479 is slack, causing the interlock plate 269 to bias into engagement with the seat-back support 30 by the wire spring 476. In this situation, return rotation of the seat-back support 30 from a forward-fold position causes the interlock post 472 to engage the interlock notch 46a, thereby preventing return of the seat-back support 30 to a use or upright position.

While the first interlock assembly 468 is disclosed in operable communication with the first floor latch mechanism 20 and the second interlock assembly 500 is disclosed in operable communication with the second kneel mechanism 24, it should be understood that the first interlock assembly 468 could alternatively be in operable communication with the second floor latch mechanism 22 while the second interlock assembly 500 could be in operable communication with the first kneel mechanism 24, and should be considered within the scope of the present invention. In addition, the first interlock assembly 468 could be operably connected to either the first or second kneel mechanism 24,26, while the second interlock assembly 500 could be operably connected to either the first or second floor latch mechanism 20,22, and should be considered within the scope of the present invention.

The second RFK half 14 further includes the second floor latch mechanism 22 and the second kneel mechanism 26. The second floor latch mechanism 22 and second kneel mechanism 26 are virtually identical to the first floor latch mechanism 20 and the first kneel mechanism 24 respectively and have been described in detail above. Again, like reference numerals are used hereinafter and in the drawings to identify like components while like reference numerals containing letter extensions are used to identify those components that have been modified.

The first and second floor latch mechanisms 20,22 are in operable communication with one another through cable 272 such that when either of the floor latch mechanisms are latched or unlatched, the other floor latch mechanism is also caused to be latched or unlatched. Similarly, the first and second recliner mechanisms 16,18 are in operable communication with each other via cable 498 such that as either of the recliner mechanisms are released, the other recliner mechanism also releases, thereby allowing for pivotable adjustment of the first and second seatback supports 28,30.

Another cable 504 is provided to interconnect the first and second kneel mechanisms 24,26 such that when either of the kneel mechanisms are latched or unlatched, the other kneel mechanism is also caused to be latched or unlatched. Specifically, a first end of cable 504 is received by the actuation lever 380 at the cable attachment aperture 426 on the first kneel mechanism 24 while a second end of cable 504 is similarly received by the cable attachment aperture 426 of the second kneel mechanism 26. Rotation of either actuation lever 380 will simultaneously cause the cable 504 to be placed under tension and subsequently rotate the other actuation lever 380 causing the kneel mechanism to disengage the cross member 374.

Figure 15:
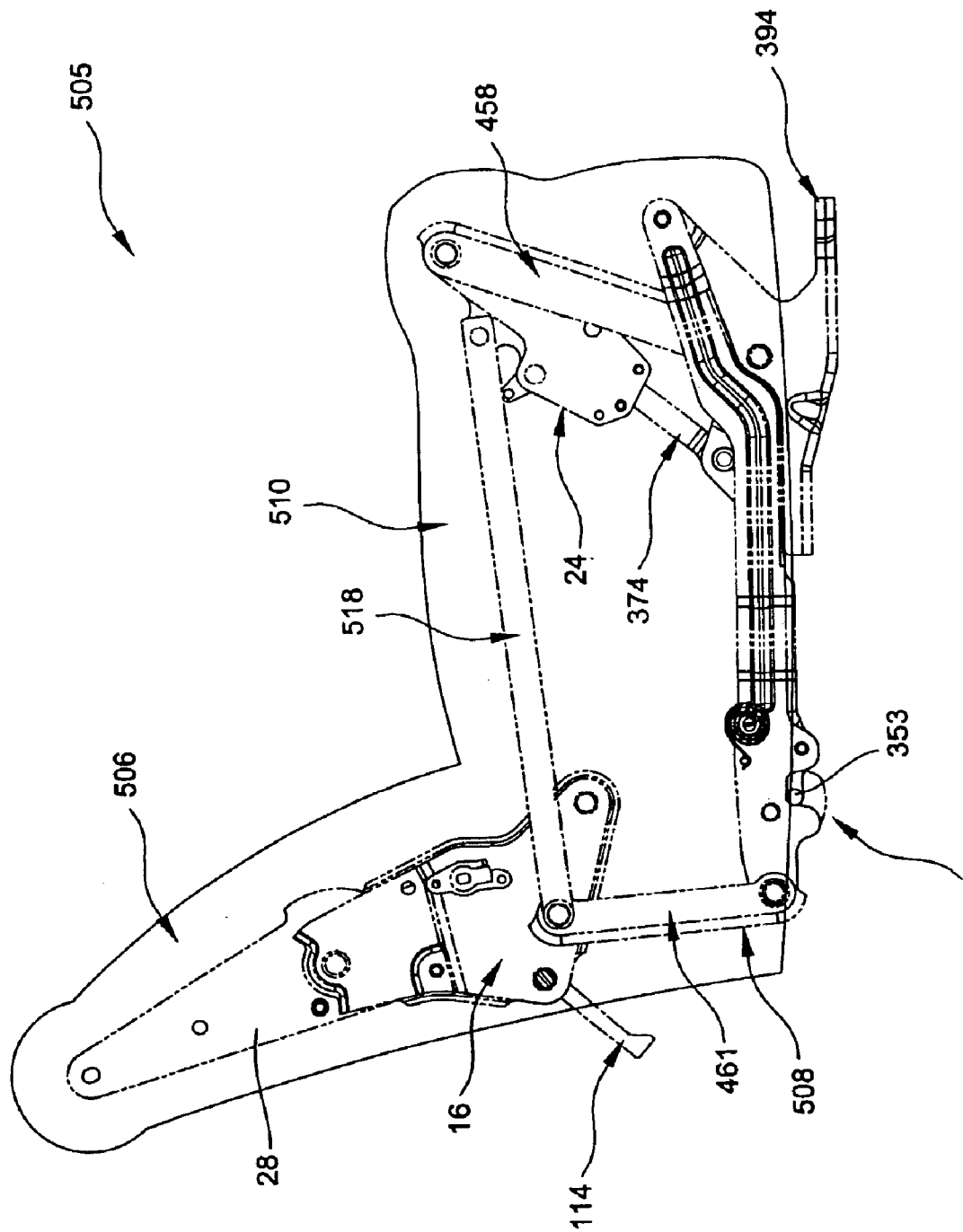
FIG. 15 is a side view of the recliner, floor-latch, and kneel assembly in a seat assembly.
Figure 16:
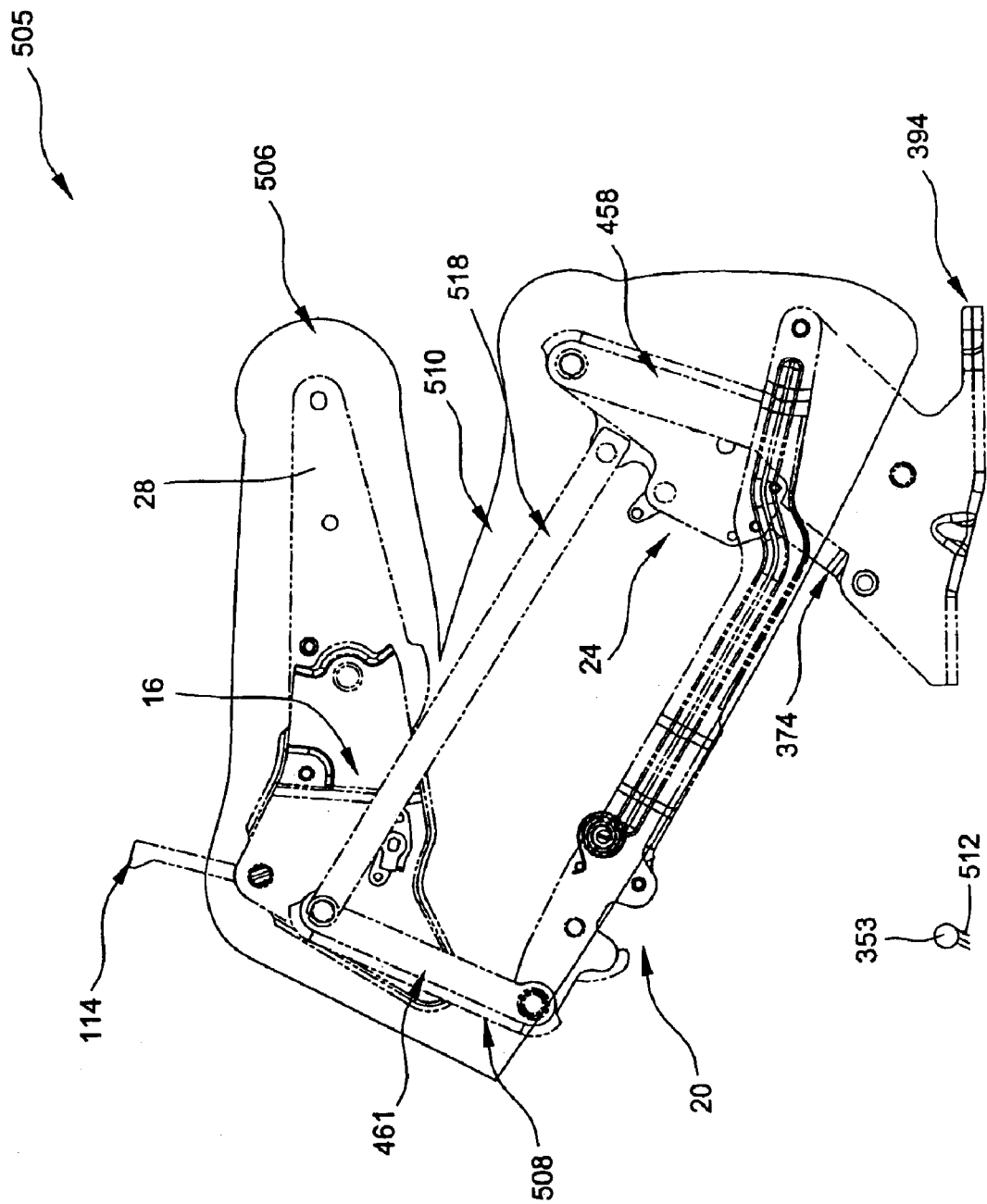
FIG. 16 is a side view of the seat assembly partially dumped forward.

In one embodiment, the RFK is integrated into a vehicle seat assembly 505 having a seat back 506, a support structure 508, and a seat bottom 510, as best shown in FIGS. 15–17. The support structure includes a set of strikers 353 fixedly mounted to a vehicle structure 512 through mounting bracket 514, front support members 458 pivotably supported by lower brackets 394, rear support members 461 pivotably supported by the first and second floor latch mechanisms 20,22, and seat bottom support brackets 518 pivotably supported by the front and rear support members 458,461.

The seat bottom 510 is supported by the front and rear support members 458,461. The front support members 458 are rotatably attached to the lower bracket 394 through attachment apertures 467 of the lower bracket 394 and attachment apertures 465 of the front support member 458. Specifically, apertures 465 of the front support member 458 and apertures 467 of the lower bracket 394 receive a pivot 466 having an axially surrounding collar 467 such that the front support member 458 rotates relative to the lower bracket 394 about collar 467.

The rear support members 461 are substantially similar to the front support members 458, whereby like reference numerals are used hereinafter and in the drawings to identify like components while like reference numerals containing letter extensions are used to identify those components that have been modified. The rear support members 461 include a front face 459 and including integral side supports 460a formed therewith. The side supports 460a include a first set of apertures 462a at a first end that receive a pivot 466 having an axially surrounding collar 467. The rear support members 461 are rotatably attached to through attachment apertures 364 of the first and second floor latch mechanisms 20,22. Attachment apertures 364 receive another pivot 466 having an axially surrounding collar 467 such that the rear support members 461 rotate relative to housings 264 of the first and second floor latch mechanisms 20,22 about collar 467.

The front and rear support members 458, 461 are pivotably supported at one end by the seat bottom support brackets 518 and at a second end by housing 462. The seat bottom support brackets 518 are elongate members having side support members 520,522 including first and second attachment apertures 524,526 formed therethrough. The seat bottom support brackets 518 are received by the side supports 460 of the front support members 458 such that the first attachment apertures 524 line up with the attachment apertures 462 of the front support member 458 and are pivotably attached thereto by another pivot 466. Pivot 466 again includes an axial collar 467 on which the front support member 458 and seat bottom support brackets 518 pivot.

The housing 462 is pivotably connected to the rear support brackets 461 at one end as previously discussed, and to the lower bracket 394 at the other end. Attachment apertures 366 receive another pivot 466 having an axial collar 467 to pivotably attach the housing 462 to the lower bracket 394 through attachment apertures 395 of the lower bracket 394. As such the housing 462 is allowed to pivot relative to the lower bracket 394 about the collar 467. In this manner, the housing 462 is pivotably connected to the front support member 458 since the front support member 458 is pivotably supported by the lower bracket 394 at attachment aperture 395.

With particular reference to FIGS. 8–17, the operation of the RFK 10 will be described in detail. The RFK 10 provides for three operational modes including articulation of the seat back 506 relative to the seat bottom 510, articulation of the seat back 506 relative to the seat bottom 510 including forward dumping of the seat assembly 505, and kneeling of the seat assembly 505 relative to the vehicle structure 512.

The first operational mode includes articulation of the seat back 506 relative to the seat bottom 510 and is best shown in FIGS. 8–12. In one embodiment, the seat 505 is provided with a handle 526 fixedly attached to the actuation lever 114a of the second recliner mechanism 18. To articulate the seat back 506 relative to the seat bottom 510 a force is applied to the handle 526 such that the actuation lever 114a is caused to rotate. Sufficient rotation of the actuation lever 114a causes rotation of the main pivot 104a and subsequently the recliner cam 102a. Rotation of the recliner cam 102a causes the reaction face 148a to disengage the first extension of the pawl 100. Without the bias from the recliner cam 102a, the pawl 100 is caused to rotate in the first rotational direction, or counterclockwise (CCW) as shown in FIG. 3. Sufficient rotation of the pawl 100 disengages the teeth 122 of the pawl 100 from the teeth 44a of the second seatback support 30. In this manner the seatback support 30, and subsequently the seatback 506, are free to rotate.

Figure 8:
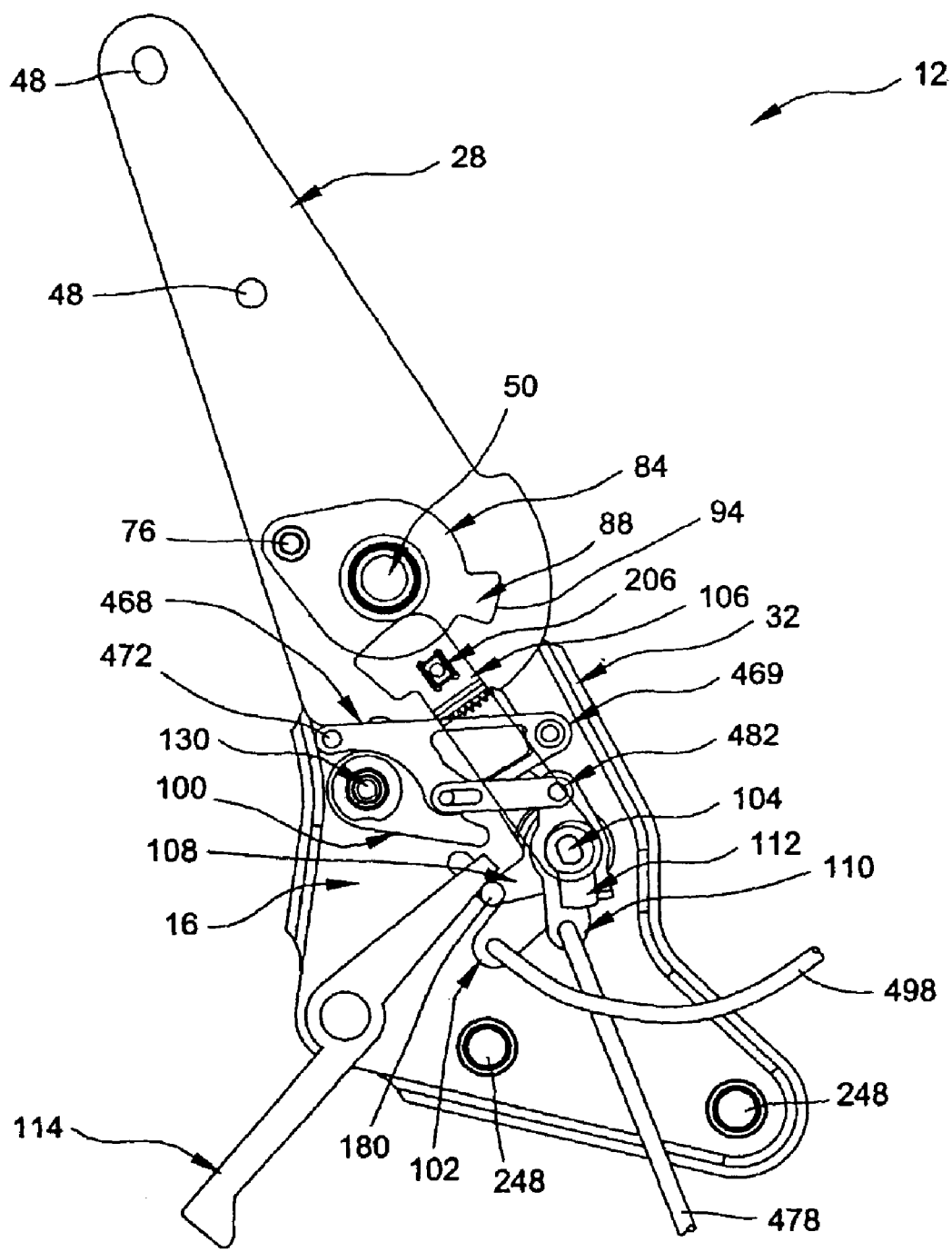
FIG. 8 is a side view of the first recliner mechanism with a trigger assembly activated.

As the recliner cam 102a is caused to rotate, cable 498 is placed under tension and subsequently applies a force to the second extension 144 of the recliner cam 102 of the first RFK half 12. As a sufficient force is applied to the second extension 144, the recliner cam 102 is caused to rotate about the main pivot 104. Sufficient rotation of the recliner cam 102 will cause the first extension 142 to disengage the pawl 100, thereby allowing the pawl 100 to rotate in the second rotational direction, or clockwise (CW) as shown in FIG. 8. Further rotation of the recliner cam 102 causes the first extension 142 to engage the second extension 118 of the pawl 100 to further rotate the pawl in the second rotational direction. Once the pawl 100 is rotated sufficiently in the first rotational direction the teeth 122 of the pawl 100 disengage the teeth 44 of the first seatback support 28, thereby allowing the first seatback support 28 to rotate relative to the inner and outer plates 32,34.

Having both the first and second recliner mechanisms 16,18 disengaged from the first and second seatback supports 28,20 respectively allows the coil spring 70 to rotate the first seatback support 28 in the second rotational direction, or clockwise as shown in FIG. 8. Because the first and second seatback supports 28,30 are received by the seatback 506 rotation of either of the first or second seatback supports 28,30 causes the other to rotate therewith. As previously discussed, forward or clockwise (CW) rotation of the first seatback support 28 subsequently rotates the second seatback support 30 and the seatback 506 relative to the seat bottom 510. Rotation of the first seatback support 28 is limited by the interaction of the post 76 and the first reaction surface 79 of the inner plate 32. Specifically, when the seatback 506 is sufficiently rotated, post 76 engages the first reaction surface 79 to prevent further forward movement of the first seatback support 28 relative to the inner and outer plates 32,34. In this manner, a range of pivotal motion of the first and second seatback supports 28,30 is defined.

To return the seatback 506 to a usable position, a force is applied generally to the seatback 506 against the bias of the coil spring 70 causing the seatback 506 to be rotated in the first rotational direction (CCW). Sufficient rotation of the seatback 506 causes the pawl 100 of the first recliner mechanism 12 to reengage the teeth 44 of the first seatback support 28 such that the seatback support 28 returns to the most forward locked position relative to the seat bottom 510. Specifically, the coil spring 166 biases the pawl 100 into engagement with the first seatback support 28 and is held in engagement with the first seatback support 28 by the coil spring 166 and the first extension 142 of the recliner cam 102, as will be discussed further below. Concurrently, the pawl 100 of the second recliner mechanism 14 reengages the teeth 44a of the second seatback support 30 due to the bias of coil spring 240. Specifically, as the actuation lever 114a is released, the coil spring 240 biases the actuation lever 114a in the second rotational direction, or CW as shown in FIG. 3, such that the actuation lever 114a rotates the main pivot 104a.

Rotation of the main pivot 104a causes the recliner cam 102a to rotate in the second rotational direction, or CW, thus causing the recliner cam 102a to disengage the second extension 116 of the pawl 100 and engage the first extension 118. When reaction surface 148a of the recliner cam 102a contacts the engagement face 124a of the pawl 100 the pawl is caused to rotate in the first rotational direction or CCW. As such, the pawl 100 is biased into engagement with the second seatback support 30. Sufficient rotation of the seatback 506 causes the pawl 100 of the second recliner mechanism 14 to reengage the teeth 44a of the second seatback support 30 such that the seatback support 30 returns to the most forward locked position relative to the seat bottom 510.

As the seatback 506 is returned to the upright or usable position, the coil spring 240 biases the actuation lever 114a in the second rotational or CW direction. Movement of the actuation lever 114a in this manner causes the cable 498 to move therewith. As the cable 498 moves, the recliner cam 102 of the first recliner mechanism 16 is caused to rotate in the first rotational direction (CCW) and subsequently causes the first extension 142 to engage the first extension 116 of the pawl. As such, the first extension 142 of the recliner cam 102 causes the pawl 100 to rotate CCW until the pawl 100 engages the first seatback support 28. Once the pawl 100 engages the first seatback support 28, the first extension 142 serves to hold the pawl 100 in engagement with the first seatback support 28.

To further adjust the seatback 506 relative to the seat bottom 510 such that the seatback 506 is reclined or moved from a forward-most upright position, a force is again applied to the handle 526 and concurrently to the seatback 506. As the handle 526 causes the actuation lever 114a to rotate, the pawl 100 of the first recliner mechanism 16 and the pawl 100 of the second recliner mechanism 18 respectively disengage the first and second seatback supports 28,30 such that pivotable movement of the seatback 506 against the bias of the coil spring 70 is permitted as previously discussed. Once the seatback 506 is sufficiently rotated in the first rotational direction (CCW) such that the desired angle of the seatback 506 relative to the seat bottom 510 is achieved, the handle 526 is released and the pawl 100 of the first recliner mechanism 16 and the pawl 100 of the second recliner mechanism 18 lock the seatback 506 in the desired position as previously discussed.

The second operational mode includes articulation of the seat back 506 relative to the seat bottom 510 including forward dumping of the seat assembly 505. In one embodiment, the RFK assembly 10 is incorporated into a seat 505 as best shown in FIGS. 15–17. To articulate the seatback 506 relative to the seat bottom 510, a force is applied to the actuation lever 114 against the bias of coil spring 240 causing the lever arm 210 of the actuation lever 114 to rotate in the second rotational direction (CW) relative to the view in FIG. 8 and engage the recliner cam 102 and the latch cam 108. Specifically, sufficient rotation of the actuation lever 114 causes the lever arm 210 to contact the second cylindrical section 184 of pin 180, thereby causing the latch cam 108 to rotate in the first rotational direction (CCW) and causing the main pivot 104 to rotate therewith.

As the pin 180 is rotated in the first rotational direction (CCW), the second cylindrical section 184 of pin 180 will eventually engage the second extension 144 of the recliner cam 102 causing the recliner cam 102 to rotate therewith. As previously discussed in the first operational mode, rotation of the recliner cam 102 causes the pawl 100 to disengage the first seatback support 28 to allow pivotal movement of the seatback 506 relative to the seat bottom 510. In addition, rotation of the recliner cam 102 causes the cable 498 to be placed under tension, thereby rotating the actuation lever 114a and releasing the pawl 100 of the second recliner mechanism 18 from the second seatback support 30. With both the first and second seatback supports 28,20 released from their respective recliner mechanisms 16,18, the seatback 506 is free to rotate under the bias of coil spring 70 in the second rotational direction (CW).

As the seatback 506 is released and allowed to rotate, continued rotation of the actuation handle 114 causes further rotation of the main pivot 104. Rotation of the main pivot causes the latch cam 108, trigger plate 106, and key 112 to rotate therewith. Further rotation of the latch cam 108 causes the main pivot 104 to rotate the trigger plate 106 such that the trigger plate 106 is in an activated position and able to interact with the first seatback support 28 as best shown in FIG. 8. More particularly, as the trigger plate 106 is sufficiently rotated by the main pivot 104, the forward (CW) rotation of the first seatback support 28 will cause the sector plate 184 to engage the trigger plate as shown in FIG. 9.

Figure 10:
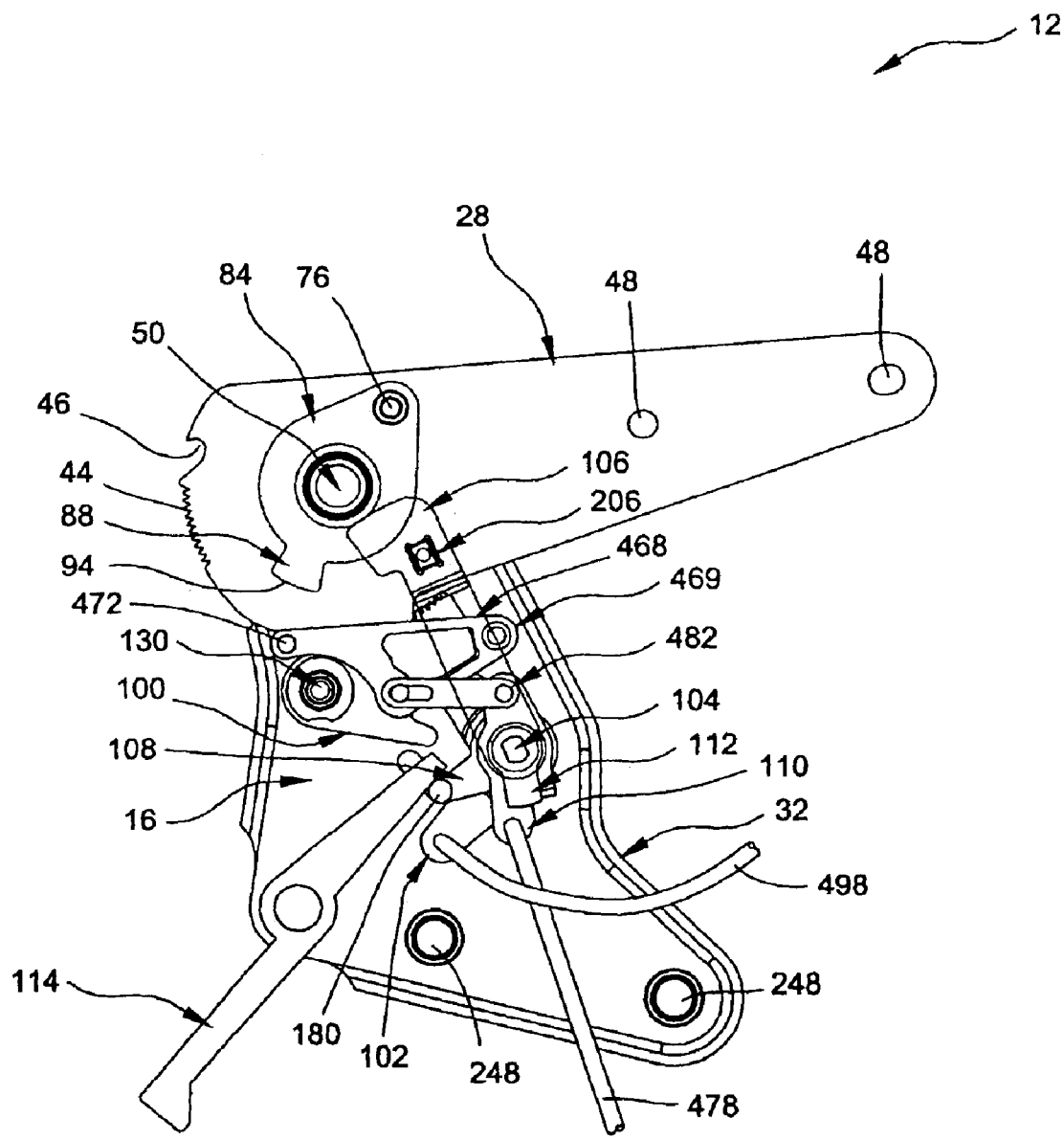
FIG. 10 is a side view of the first recliner mechanism with a trigger mechanism reset.
Figure 11:
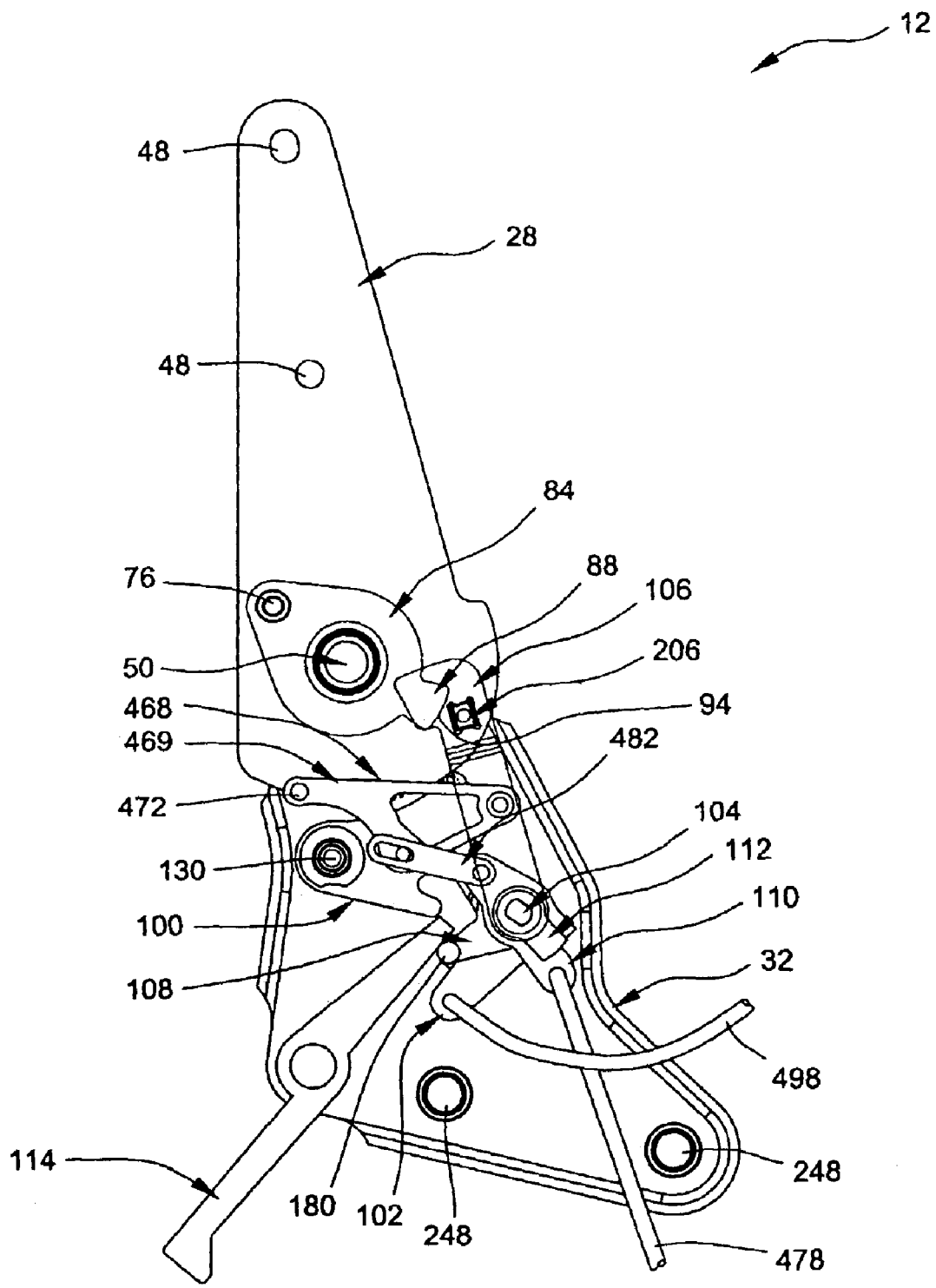
FIG. 11 is a side view of an interlock mechanism in the locked position.
Figure 12:
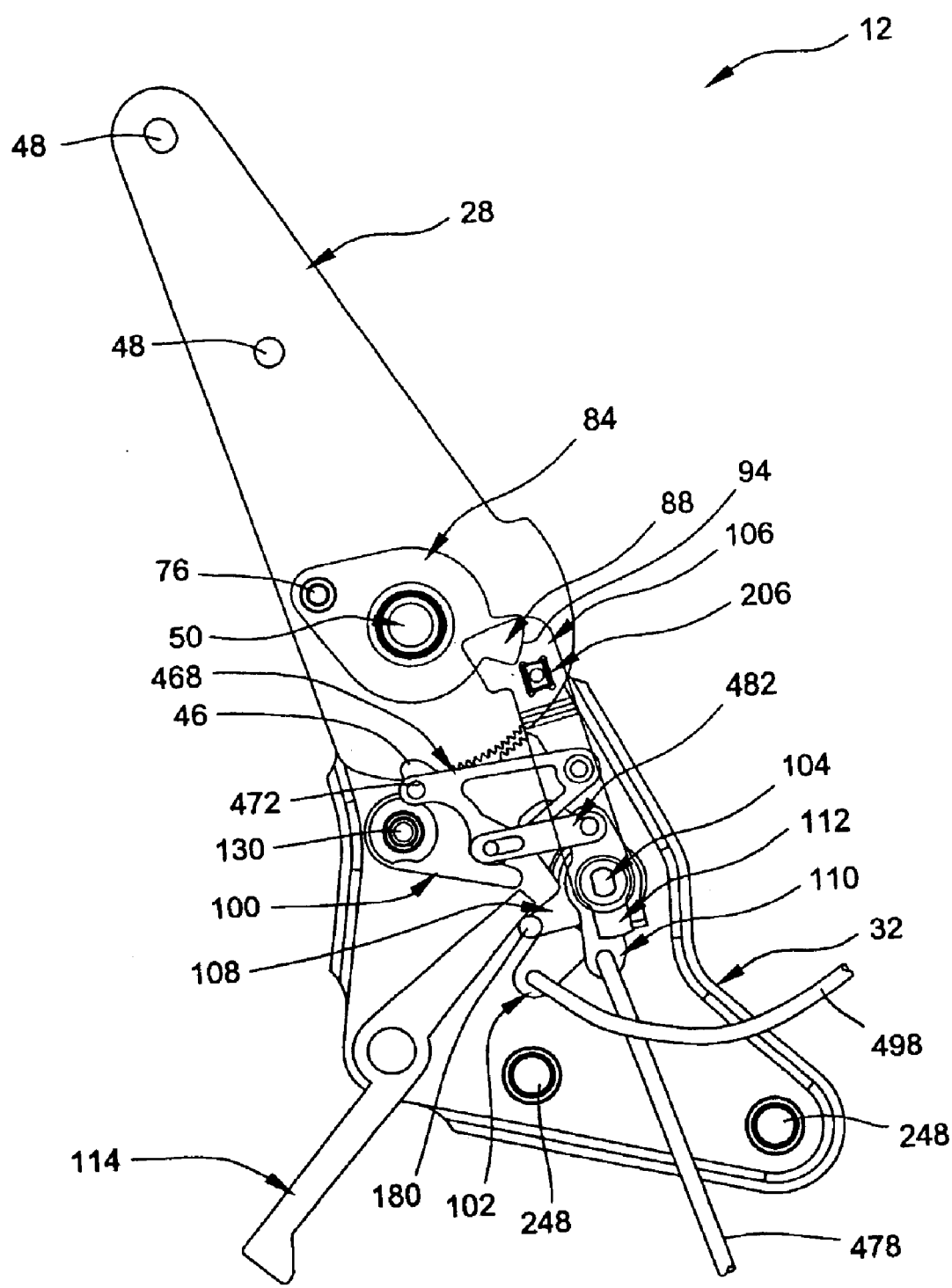
FIG. 12 is a side view of an interlock mechanism in the released position.

As the main pivot 104 rotates the trigger plate 106 into an activated position, the pin 206 of the trigger plate 106 engages the first reaction surface 90 of the sector plate 184 as the seatback 506 is caused to rotate forward (CW) under the bias of the coil spring 70. Continued rotation of the seatback 506 causes the pin 206 to move from the first reaction surface 90 and onto the arcuate surface 94 as shown in FIG. 9. As the pin 206 moves along the arcuate surface 94 generally from the first reaction surface 90 to the second reaction surface 92, the trigger plate 106 is caused to further rotate in the first rotational direction (CCW). Once the pin 206 has completely moved from the first reaction surface 90 across the arcuate surface 94, the pin 206 then disengages the cam surface 88 altogether and the first seatback support 28 continues forward rotation as best shown in FIGS. 10–12.

Figure 9:
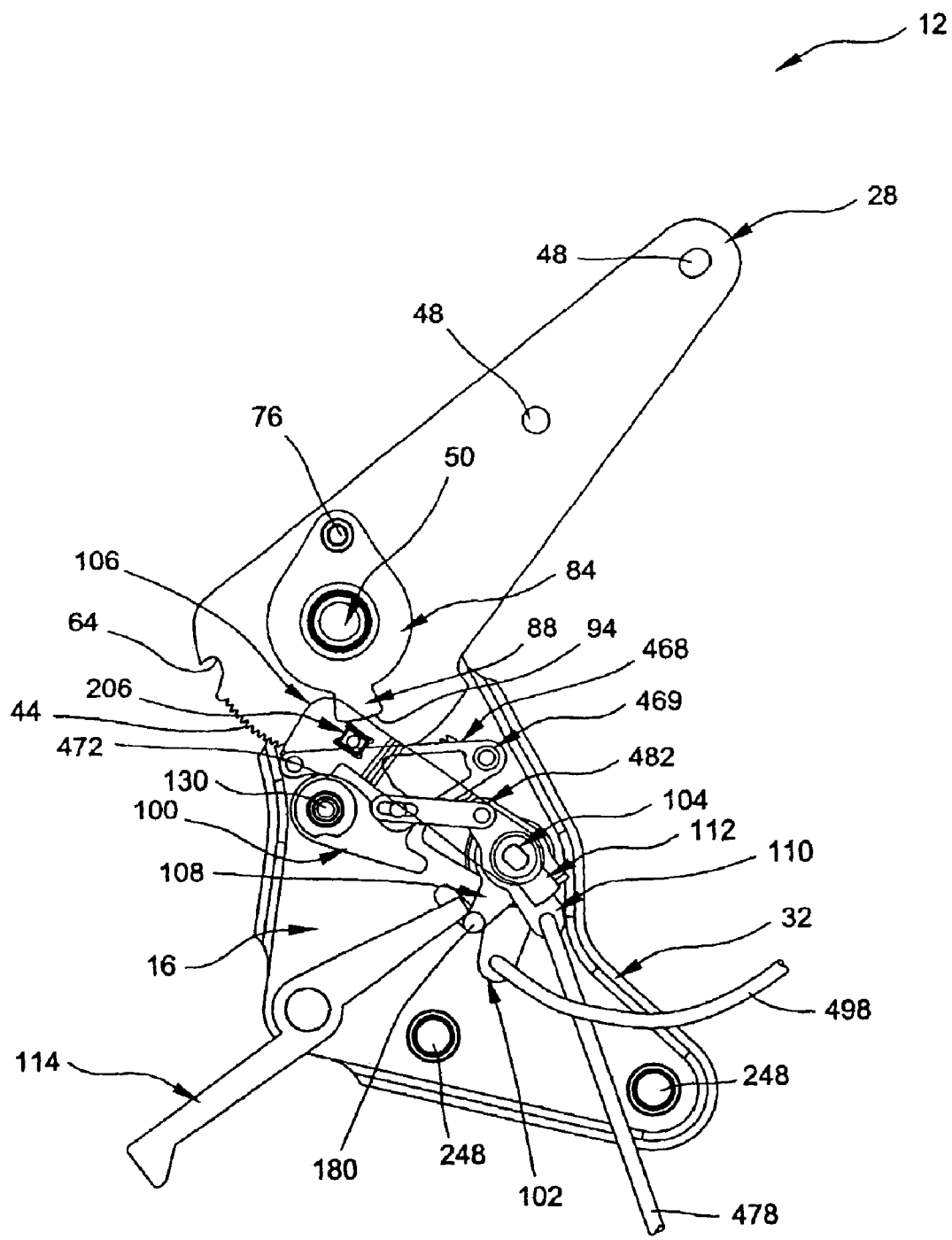
FIG. 9 is a side view of the first recliner mechanism with a trigger activated and contacting a seatback support member.

Further rotation of the main pivot 104 caused by the rotation of the trigger plate 106 causes the key 112 to engage the tab 194 of the latch link 110 and rotate the latch link 110 as best shown in FIG. 9. Rotation of the latch link 110 causes the cable 478 to be placed under tension, thereby causing the actuation handle 259 of the first floor latch mechanism 20 to rotate and release the first floor latch mechanism 20 from the striker 353. Specifically, as the actuation handle 259 rotates, the actuation cam 258 is caused to rotate against the bias of coil spring 304 and engage the latch cam 260. As the extension 298 of the actuation cam 258 rotates in the first rotational direction (CCW), the engagement face 302 of the extension 298 will contact the second extension 316 of the latch cam 260 and cause the latch cam 260 to rotate in the second rotational direction or CW as best shown in FIGS. 13a and 13b. Continued rotation of the actuation cam 258 and subsequently the latch cam 260 causes the first extension 314 of the latch cam 260 to disengage the reaction face 338 of the latch 262.

At this point, the latch 262 is free to pivot unrestricted by the latch cam 260 and as such, the latch spring 342 causes the latch 262 to rotate in the in the first rotational direction (CCW). Sufficient rotation of the latch 262 will release the latch 262 from the striker 253, thereby releasing the first floor latch mechanism 20 from the vehicle structure 512.

To fully dump the seat 505 forward both floor latch mechanisms must be disengaged from their respective strikers 353. The second floor latch mechanism 22 operates in the same fashion as the first floor latch mechanism 20 with the exception that the second floor latch mechanism 22 does not communicate directly with the first recliner mechanism 16. The second floor latch mechanism 22 is actuated through the cable 272 interconnecting the actuation lever 259 of the first floor latch mechanism 20 and the actuation lever 259 of the second floor latch mechanism 22. Specifically, as the actuation lever 259 of the first floor latch mechanism 20 is caused to rotate, the cable 272 is placed under tension and causes the actuation lever 259 of the second floor latch mechanism 22 to rotate. As such, the first and second floor latch mechanisms 20,22 are generally concurrently released from their respective strikers 353 as shown in FIG. 13b, thereby allowing the seat 505 to dump forward and rotate about pivot 166 such that the front support members 458 rotate relative to the lower bracket 394. At this point, the seat back 506 is fully pivoted forward and the seat 505 is fully dumped forward.

To return the seat to a usable condition, a force is applied generally to the seat 505 such that the front support members 458 rotate relative to the lower bracket 394 about pivot 166 in the first rotational direction (CCW as shown in FIG. 16). As the seat 505 is rotated into position, the first and second floor latch mechanisms 20,22 are free to accept strikers 353 and re-latch to the vehicle structure 512. The latch plate 354 is positioned such that the reaction face 356 of the latch plate 512 receives a striker 353 and causes the latch 262 to rotate in the second rotational direction (CW). In this manner, the striker recess 340 accepts the striker 353 and further rotates the latch 262 CCW against the bias of the latch spring 342 as shown in FIG. 13a.

With particular reference to FIG. 13a, the latch 262 is again held in the latched position due to the engagement of the latch cam 260. Specifically, the engagement face 318 of the latch cam 260 engages the latch 262 due to the bias of the coil spring 304. Specifically, the coil spring 304 causes the actuation cam 528 to be biased in second rotational direction (CW) such that the second extension 299 of the actuation cam 258 contacts the second extension 316 of the latch cam 260, thereby rotating the latch cam 260 in the first rotational direction (CCW). Once the latch cam 260 is sufficiently rotated the second extension 299 of the actuation cam 258 contacts the second extension 316 of the latch cam 260, thereby rotating the engagement face 318 of the latch cam 260 into a position to receive the engagement face 338 of the latch 262. Once the engagement face 338 of the latch 262 engages the engagement face 318 of the latch cam 260 the latch mechanism is in the latched position.

Once both of the floor latch mechanisms 20,22 are securely latched to strikers 353 the tension in the cable 272 interconnecting the first and second floor latch mechanisms 20,22 is released while the tension in cable 478 interconnecting the first floor latch mechanism 20 and the first recliner mechanism 16 is increased. As such, the latch link 110 and subsequently the main pivot 104 are rotated against the bias of spring 476. In this manner, the latch link 110 rotates the link 482 such that the interlock plate 269 is pulled against the bias of the spring 476 and enabling return of the seat-back support 28 from a forward-fold position to a use or upright position as previously discussed in the first operational mode and shown in FIG. 12. If, on the other hand, either floor-latch mechanism 20,22 is not properly secure, the first interlock cable 478 is slack, causing the interlock plate 269 to bias into engagement with the seat-back support 28 by the wire spring 476. In this situation, return rotation of the seat-back support 28 from a forward-fold position causes the interlock post 472 to engage the interlock notch 46, thereby preventing return of the seat-back support 28 to a use or upright position as shown in FIG. 11.

The third operational mode includes kneeling of the seat assembly 505 relative to the vehicle structure 512. In one In one embodiment, the RFK Assembly 10 is incorporated into a seat 505 as best shown in FIGS. 15–17. The kneeling function allows for the pivotal movement of the seat 505 forward while maintaining use of the vehicle seat 505. Specifically, the front support members 458 of the seat support structure 508 pivot about the lower bracket 394 and also about the seat bottom support brackets 518. In addition, the rear support members 361 pivot about the housings 264 of the first and second floor latch mechanisms 20,22 and also about the seat bottom support brackets. In this manner, as the front and rear support members 458,361 pivot forward, the seat bottom support brackets 518 longitudinally move forward while the bottom plate 394 and floor latch housings 462 remain attached to the vehicle structure 512 as best shown FIG. 17.

As previously mentioned the cross member 374 is pivotably supported at by pivot 166 at the junction of the front support members 458 and the seat bottom support brackets 518. As such, if the cross member 374 is in a latched position it is not permitted to slide relative to the housing 382 and the pivotal movement of the seat support structure 508 as previously described is not possible as best shown in FIG. 14a. To allow for selective pivotal movement of the seat support structure 508, the first and second kneel mechanisms 24,26 have to be in an unlatched position such that the cross member 374 is permitted to slide relative to the housing 382 as shown in FIG. 14b.

To unlatch the first and second kneel mechanisms 24,26 a force is applied to the external handle 528 of the second kneel mechanism 26 such that the actuation lever 380 is caused to rotate. As the actuation lever 380 is caused to rotate in the first rotational direction (CCW) the actuation handle 380 compresses the spring 446, thereby causing the ball 448 to rotate in socket 428. Once the actuation lever 380 is sufficiently rotated, the base of the extension 422 disengages the cross member 374. As the actuation lever 380 disengages the cross member 374, the teeth 390 of the cross member 374 disengage the teeth 414 of the locking pawl 376. As previously mentioned, the actuation handle 380 of the first kneel mechanism 24 is operably connected to the actuation handle 26 of the second kneel mechanism 26 by cable 504 and is therefore actuated concurrently with the second kneel mechanism 26.

With both cross members 374 of the first and second kneel mechanisms 24,26 free to slide in their respective housings 382, the seat support structure 508 is free to pivot forward, as best shown in FIG. 17. To pivot the seat support structure 508 forward, a force is applied generally to the seat 505 once the first and second kneel mechanisms 24,26 are in the unlatched position such that the seat is caused to move forward. Once the seat 505 begins to move forward, the cross members 374 rotate about pivot 166 at the lower bracket 394 and slide within the housings 382. At this point, the cross members 374 are both moving forward and down as the seat 505 and seat support structure 508 pivot forward and down. Forward movement of the seat 505 is restricted once the front support members 458 contact the lower bracket 394 as best shown in FIG. 17.

To return the first and second kneel mechanisms 24,26 to the latched position, a force is again applied to the seat 505 such that the seat 505 is caused to move rearward and back into an upright position. Specifically, as the seat 505 is caused to rotate rearward, the cross member 374 slides in the housing 382 until the teeth 390 of the cross member 374 again contact the teeth 414 of the locking pawl 376. Due to the bias of the spring 446 on the actuation lever 380, the bottom face of the extension 422 is slidably engaged with the cross member 374 such that the cross member 374 is biased into engagement with the locking pawl 376. Once the seat 505 is sufficiently rotated rearward the teeth 390 of the cross member 374 engage the teeth 414 of the locking pawl 376, thereby returning the kneel mechanism to the latched position.

Once both of the kneel mechanisms 24,26 are securely latched to the cross members 374, the tension in the cable 504 interconnecting the first and second kneel mechanisms 24,26 is released while the tension in cable 479 interconnecting the second kneel mechanism 26 and the second recliner mechanism 18 is increased. As such, the interlock plate 269 is rotated against the bias of spring 476. In this manner, the tension in the cable 479 causes the interlock plate 269 to be pulled against the bias of the spring 476 and enables the return of the seat-back support 30 from a forward-fold position to a use or upright position as previously discussed in the first operational mode. If, on the other hand, either kneel mechanism 24,26 is not properly secure, the second interlock cable 479 is slack, causing the interlock plate 269 to bias into engagement with the seat-back support 30 by the wire spring 476. In this situation, return rotation of the seat-back support 30 from a forward-fold position causes the interlock post 472 to engage the interlock notch 46a, thereby preventing return of the seat-back support 30 to a use or upright position. It should be noted that the first and second kneel mechanisms 24,26 are operable if the seatback 506 is rotated forward or not.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat adjustment mechanism for a vehicle seat including a seat bottom supported by the vehicle and a seat back coupled to the seat bottom, said mechanism comprising:
    a first latch mechanism connected to the vehicle seat and providing rotation of the seat bottom relative to the vehicle in an unlocked state and preventing rotation of the seat bottom relative to the vehicle in a locked state;
    a first kneel mechanism connected to the vehicle seat, said first kneel mechanism having a locking mechanism providing translation of the seat bottom relative to the vehicle in an unlocked state and preventing translation of the seat bottom relative to the vehicle in a locked state; and
    a first recliner mechanism coupled to the seat bottom and seat back and providing selective rotation of the seat back relative to the seat bottom, said recliner mechanism preventing rotation of the seat back relative to the seat bottom when at least one of said first latch mechanism and said first kneel mechanism is in said unlocked state.

2. The seat adjustment mechanism of claim 1, further comprising a second recliner mechanism, a second latch mechanism and a second kneel mechanism said second recliner mechanism being coupled to the seat bottom and seat back and in communication with said second latch mechanism and said second recliner mechanism.

3. The seat adjustment mechanism of claim 2, further comprising a second interlock mechanism connected to said second recliner mechanism and operable between a locked state and an unlocked state to selectively restrict movement of said second recliner mechanism.

4. The seat adjustment mechanism of claim 3, wherein said second interlock mechanism is in operable communication with said second latch mechanism, said second latch mechanism operable between a locked state and an unlocked state, to selectively restrict movement of said second recliner mechanism.

5. The seat adjustment mechanism of claim 3, wherein said second interlock mechanism is in operable communication with said second kneel mechanism, said second kneel mechanism operable between a locked state and an unlocked state, to selectively restrict movement of said second recliner mechanism.

6. The seat adjustment mechanism of claim 2, wherein said second recliner mechanism is in operable communication with said first recliner mechanism.

7. The seat adjustment mechanism of claim 6, wherein said first latch mechanism is in operable communication with said second recliner mechanism.

8. The seat adjustment mechanism of claim 6, wherein said first kneel mechanism is in operable communication with said second recliner mechanism.

9. The seat adjustment mechanism of claim 2, wherein said second latch mechanism is in operable communication with said first latch mechanism.

10. The seat adjustment mechanism of claim 2, wherein said second kneel mechanism is in operable communication with said first kneel mechanism.

11. The seat adjustment mechanism of claim 2, wherein said second latch mechanism is in operable communication with said first recliner mechanism.

12. The seat adjustment mechanism of claim 2, wherein said second kneel mechanism is in operable communication with said first recliner mechanism.

13. The seat adjustment mechanism of claim 1, further comprising a first interlock mechanism connected to said first recliner mechanism and operable between a locked state and an unlocked state to selectively restrict movement of said first recliner mechanism.

14. The seat adjustment mechanism of claim 13, wherein said first interlock mechanism is in operable communication with said first latch mechanism to selectively restrict movement of said first recliner mechanism.

15. The seat adjustment mechanism of claim 13, wherein said first interlock mechanism is in operable communication with said first kneel mechanism to selectively restrict movement of said first recliner mechanism.

16. An adjustable seat assembly, comprising:
   a seat bottom pivotably supported by first and second support members;
   a seat back pivotably connected to said seat bottom;
   a bottom support member pivotably supporting said first and second support members;
   a lower bracket pivotably supporting said bottom support member; and
   an adjustment mechanism comprising:
      a first latch mechanism connected to the seat assembly and providing rotation of said seat bottom relative to said lower bracket in an unlocked state and preventing rotation of said seat bottom relative to said lower bracket in a locked state;
      a first kneel mechanism connected to the seat assembly, said first kneel mechanism having a locking mechanism providing translation of said seat bottom relative to said lower bracket in an unlocked state and preventing translation of said seat bottom relative to said lower bracket in a looked state; and
      a first recliner mechanism coupled to said seat bottom and said seat back and providing selective rotation of said seat back relative to said seat bottom, said recliner mechanism preventing rotation of said seat back relative to said seat bottom when at least one of said first latch mechanism and said first kneel mechanism is in said unlocked state.

17. The seat adjustment mechanism of claim 16, further comprising a second recliner mechanism, a second latch mechanism and a second kneel mechanism, said second recliner mechanism being coupled to said seat bottom and said seat back and in communication with said second latch mechanism and said second recliner mechanism.

18. The seat adjustment mechanism of claim 17, further comprising a second interlock mechanism connected to said second recliner a first pivot and pivotably connected to said second support members at a second end by a second pivot.

19. The seat adjustment mechanism of claim 18, wherein said second interlock mechanism is in operable communication with said second latch mechanism, said second latch mechanism operable between a locked state and an unlocked state, to selectively restrict movement of said second recliner mechanism.

20. The seat adjustment mechanism of claim 18, wherein said second interlock mechanism is in operable communication with said second kneel mechanism, said second kneel mechanism operable between a locked state and an unlocked state, to selectively restrict movement of said second recliner mechanism.

21. The seat adjustment mechanism of claim 17, wherein said second recliner mechanism is in operable communication with said first recliner mechanism.

22. The seat adjustment mechanism of claim 21, wherein said first latch mechanism is in operable communication with said second recliner mechanism.

23. The seat adjustment mechanism of claim 21, wherein said first kneel mechanism is in operable communication with said second recliner mechanism.

24. The seat adjustment mechanism of claim 17, wherein said second latch mechanism is in operable communication with said first latch mechanism.

25. The seat adjustment mechanism of claim 17, wherein said second kneel mechanism is in operable communication with said first kneel mechanism.

26. The seat adjustment mechanism of claim 17, wherein said second latch mechanism is in operable communication with said first recliner mechanism.

27. The seat adjustment mechanism of claim 17, wherein said second kneel mechanism is in operable communication with said first recliner mechanism.

28. The seat adjustment mechanism of claim 16, further comprising a first interlock mechanism connected to said first recliner mechanism and operable between a locked state and an unlocked state to selectively restrict movement of said first recliner mechanism.

29. The seat adjustment mechanism of claim 28, wherein said first interlock mechanism is in operable communication with said first latch mechanism to selectively restrict movement of said first recliner mechanism.

30. The seat adjustment mechanism of claim 28, wherein said first interlock mechanism is in operable communication with said first kneel mechanism to selectively restrict movement of said first recliner mechanism.

31. An adjustable seat assembly, comprising:
   a seat bottom pivotably supported by first and second support members;
   a seat back pivotably connected to said seat bottom;
   a bottom support member pivotably supporting said first and second support members;
   a lower bracket pivotably supporting said bottom support member; and
   an adjustment mechanism comprising:
      a first latch mechanism supported by said bottom support member, said first latch mechanism providing rotation of said seat bottom relative to said lower mechanism and operable between a locked state and an unlocked state to selectively restrict movement of said second recliner mechanism.

32. The adjustable seat assembly of claim 31, wherein said seat bottom includes a pair of support brackets.

33. The adjustable seat assembly of claim 32, wherein said support brackets are pivotably connected to said first support members at a first end by bracket in an unlocked state and preventing rotation of said seat bottom relative to said lower bracket in a locked state;
   a first kneel mechanism supported by said seat bottom and said first support member, said first kneel mechanism having a locking mechanism selectively fixing said first member to said seat bottom in a locked state to prevent rotation between said seat bottom and said first support member; and
   a first recliner mechanism coupled to said seat bottom and said seat back and providing selective rotation of said seat back relative to said seat bottom, said recliner mechanism preventing rotation of said seat back relative to said seat bottom when at least one of said first latch mechanism and said first kneel mechanism is in said unlocked state.

34. The adjustable seat assembly of claim 33, wherein said first kneel mechanism is pivotably supported at a first end by said first pivot and pivotably supported at a second end by said bottom support member, said first kneel mechanism fixing said support brackets to said first support member in said locked state.

35. The adjustable seat assembly of claim 31, wherein said bottom support member includes an inner and outer housing plate supporting said first latch mechanism therebetween.

36. The adjustable seat assembly of claim 31, wherein said lower bracket includes a third pivot for pivotably supporting said bottom support member for rotation of said bottom support member relative thereto.

37. The adjustable seat assembly of claim 31, wherein said bottom support member includes a fifth pivot for pivotably supporting said second support members.

* * * * *

UNITED STATES PATENT AND TRADEMARK OFFICE
CERTIFICATE OF CORRECTION

PATENT NO. : 6,857,703 B2
DATED : February 22, 2005
INVENTOR(S) : Jeffrey T. Bonk It is certified that error appears in the above-identified patent and that said Letters Patent is hereby corrected as shown below:

Column 23,
Line 32, "looked" should be -- locked --.
Lines 48-49, "a first pivot and pivotably connected to said second support members at a second end by a second pivot." should be -- mechanism and operable between a locked state and an unlocked state to selectively restrict movement of said second recliner mechanism. --

Column 24,
Lines 44-46, "mechanism and operable between a locked state and an unlocked state to selectively restrict movement of said second recliner mechanism." should be -- bracket in an unlocked state and preventing rotation of said seat bottom relative to said lower bracket in a locked state;
    a first kneel mechanism supported by said seat bottom and said first support member, said first kneel mechanism having a locking mechanism selectively fixing said first member to a said seat bottom in a locked state to prevent rotation between said seat bottom and said first support member; and
    a first recliner mechanism coupled to said seat bottom and said seat back and providing selective rotation of said seat back relative to said seat bottom, said recliner mechanism preventing rotation of said seat back relative to said seat bottom when at least one of said first latch mechanism and said first kneel mechanism is in said unlocked state. --
Lines 51-67, "bracket in an unlocked state and preventing rotation of said seat bottom relative to said lower bracket in a locked state;
    a first kneel mechanism supported by said seat bottom and said first support member, said first kneel mechanism having a locking mechanism selectively fixing said first member to said seat bottom in a locked state to prevent rotation between said seat bottom and said first support member; and
    a first recliner mechanism coupled to said seat bottom and said seat back and providing selective rotation of said seat back relative to said seat bottom, said recliner mechanism preventing rotation of said seat back relative to said seat bottom when at least one of said first latch mechanism and said first kneel mechanism is in said unlocked state."

UNITED STATES PATENT AND TRADEMARK OFFICE
CERTIFICATE OF CORRECTION

PATENT NO. : 6,857,703 B2
DATED : February 22, 2005
INVENTOR(S) : Jeffrey T. Bonk It is certified that error appears in the above-identified patent and that said Letters Patent is hereby corrected as shown below:

<u>Column 24 (cont'd),</u>
should be -- a first pivot and pivotably connected to said second support members at a second end by a second pivot. --

Signed and Sealed this

Twenty-fourth Day of May, 2005

JON W. DUDAS
*Director of the United States Patent and Trademark Office*